United States Patent
Guan et al.

(10) Patent No.: US 11,884,278 B2
(45) Date of Patent: Jan. 30, 2024

(54) VEHICLE SENSORS ARRANGEMENT AND METHOD FOR MAPPING THE ROAD PROFILES

(71) Applicant: Shenzhen Gudsen Technology Co., LTD

(72) Inventors: Chenyong Guan, Shenzhen (CN); Yu Jiang, Wellesley, MA (US)

(73) Assignee: SHENZHEN GUDSEN TECHNOLOGY CO., LTD, Shenzhe (CN)

( * ) Notice: Subject to any disclaimer, the term of this patent is extended or adjusted under 35 U.S.C. 154(b) by 196 days.

(21) Appl. No.: 17/336,821

(22) Filed: Jun. 2, 2021

(65) Prior Publication Data

US 2022/0009501 A1    Jan. 13, 2022

Related U.S. Application Data

(63) Continuation of application No. PCT/CN2020/101594, filed on Jul. 13, 2020.

(51) Int. Cl.
*B60W 40/06* (2012.01)
*B60W 40/109* (2012.01)
(Continued)

(52) U.S. Cl.
CPC ............ *B60W 40/06* (2013.01); *B60W 10/18* (2013.01); *B60W 10/20* (2013.01); *B60W 10/22* (2013.01); *B60W 40/109* (2013.01); *B60W 40/112* (2013.01); *B60W 40/12* (2013.01); *B60W 2420/42* (2013.01); *B60W 2520/125* (2013.01);
(Continued)

(58) Field of Classification Search
None
See application file for complete search history.

(56) References Cited

U.S. PATENT DOCUMENTS 8,483,924 B2 * 7/2013 Obuchi ............... B60W 40/112
                                                            701/72
10,836,386 B2 * 11/2020 Chen .................... B60W 40/06
(Continued)

FOREIGN PATENT DOCUMENTS

CN       102307739       1/2012
CN       104097641       10/2014
(Continued)

OTHER PUBLICATIONS

International Search Report and Written Opinion on PCT PCT/CN2020/101594 dated Apr. 9, 2021.

*Primary Examiner* — Todd Melton
(74) *Attorney, Agent, or Firm* — Foley & Lardner LLP

(57) ABSTRACT

Systems, methods, and apparatuses for controlling components of a vehicle are provided. The vehicle can include a data processing system ("DPS") including one or more processors and memory. The DPS can receive sensor data from sensors of the vehicle. The DPS can determine a vehicle body height. The DPS can determine a vehicle roll angle. The DPS can determine a first height of a road and a second height or the road. The DPS can determine a road height based on the first height of the road and the second height of the road. The DPS can provide the road height to a controller of one or more vehicles. The DPS can adjust the component of the one or more vehicles.

20 Claims, 8 Drawing Sheets

(51) Int. Cl.
  *B60W 40/12*   (2012.01)
  *B60W 10/20*   (2006.01)
  *B60W 10/18*   (2012.01)
  *B60W 10/22*   (2006.01)
  *B60W 40/112*  (2012.01)

(52) U.S. Cl.
  CPC ..... *B60W 2552/20* (2020.02); *B60W 2552/40* (2020.02)

(56) References Cited

U.S. PATENT DOCUMENTS

| | | | |
|---|---|---|---|
| 11,189,250 B2 * | 11/2021 | Hato | B60R 1/001 |
| 11,285,773 B1 * | 3/2022 | Hall | B60G 17/0161 |
| 11,505,023 B2 * | 11/2022 | Cho | B60G 17/0165 |
| 11,530,932 B2 * | 12/2022 | Jean | G01C 21/3694 |
| 2021/0001861 A1 * | 1/2021 | Lobey | B60W 40/068 |
| 2021/0284172 A1 * | 9/2021 | Birkland | B60W 40/112 |

FOREIGN PATENT DOCUMENTS

| | | |
|---|---|---|
| CN | 107554523 | 1/2018 |
| CN | 108297872 | 7/2018 |
| CN | 109883394 | 6/2019 |
| KR | 100731695 | 6/2007 |

* cited by examiner

VEHICLE SENSORS ARRANGEMENT AND METHOD FOR MAPPING THE ROAD PROFILES

CROSS-REFERENCE TO RELATED APPLICATIONS

The present application is a continuation of and claims the benefit of priority to International Application No. PCT/CN2020/101594 filed Jul. 13, 2020, the entire contents of which are incorporated herein by reference.

BACKGROUND

Vehicles can be equipped with control systems to assist drivers on the road. The control systems can operate a suspension system, a brake system, and a steering system of the vehicle. The control systems can assist the vehicle with braking, steering, or absorbing shocks of the vehicle during travel by operating the systems.

SUMMARY

This disclosure is directed to systems, methods, and apparatus of mapping road profiles. Due to the technical challenges of controlling the suspension system of the vehicle, the suspension system of the vehicle may dampen forces exerted to the body of the vehicle after detecting body movement of the vehicle. However, controlling the suspension system after detecting the body movement (e.g., caused by an impact with an obstacle) can reduce traction between the vehicle and the road. The reduction of the traction can interfere with the driver's control of the vehicle, jeopardizing the safety of the driver. For example, the vehicle can encounter an obstacle on the road, such as a pothole. The vehicle can receive an impact from the obstacle. The impact can induce the driver to steer the vehicle away from the center of the road. Thereafter, the suspension system activates to dampen the force exerted onto the vehicle after the interference to the control of the vehicle. These additional criteria to activate the suspension system can degrade the performance of the vehicle and compromise the safety of the driver.

Systems, methods, and apparatus of this technical solution provide preview signals for vehicles to improve the performance of an advanced driver assistance systems (i.e., control systems or "ADAS"). The ADAS can include suspension system, steering system, brake system, and other systems to facilitate control of the vehicle. The preview signals can refer to instructions for the vehicle to control one or more components of the vehicle. The vehicle can receive the preview signals to assist drivers with controlling the vehicle. The vehicle of this technical solution can map the road profile and construct a map or database of surfaces of the road. The vehicle can be equipped with sensors to collect sensor data and a data processing system electrically connected to process the sensor data. The map can incorporate the sensor data to support the ADAS and road management. By incorporating sensor data with the ADAS, the system can improve localization, fuel consumption, and safety of the vehicle.

At least one aspect is directed to a system to control components of a vehicle. The vehicle can include a data processing system including one or more processors and memory. The data processing system can receive, via an inertial measurement unit ("IMU") on the vehicle that measures at a frequency of at least 100 Hertz, vertical acceleration data, angular velocity data, and lateral acceleration data. The data processing system can receive, via a first range sensor on the vehicle that measures at the frequency and is located on a lateral axis of the vehicle with the IMU, first vertical displacement data corresponding to a distance between the first range sensor and a first portion of a ground that contacts a first tire of the vehicle. The data processing system can receive, via a second range sensor on the vehicle that measures at the frequency and is located on the lateral axis of the vehicle with the IMU, second vertical displacement data corresponding to a distance between the second range sensor and a second portion of the ground that contacts a second tire of the vehicle. The data processing system can receive, via a positioning sensor on the vehicle, location data of the vehicle and altitude data of the vehicle. The data processing system can determine a vertical vehicle body height based on fusing the vertical acceleration data and the altitude data. The data processing system can determine a vehicle roll angle based on fusing the vertical acceleration data, the angular velocity data, and the lateral acceleration data. The data processing system can determine a first height of a first side of the vehicle and a second height of a second side of the vehicle based on a track width of the vehicle, the first vertical displacement data, the second vertical displacement data, the vertical vehicle body height, and the vehicle roll angle. The data processing system can determine a road height at the location on the ground based on the first height of the first side of the vehicle and the second height of the second side of the vehicle. The data processing system can provide the road height to a controller of one or more vehicles to cause the controller to control a component of the one or more vehicles based on the road height.

The data processing system can receive, via at least one imaging sensor on the vehicle, a road image and lateral deviation data at the location of the vehicle. The data processing system can determine, based on the road image, road grade data and road friction data of the ground. The data processing system can detect, using an image processing technique, a lane of the ground at the location of the vehicle and an object on the ground based on the road image, the object comprising a type of obstruction on the ground. The data processing system can determine, based on the lateral deviation data, a lateral distance indicating the location of the vehicle from a center of the lane. The data processing system can generate, based on the lane of the ground and the lateral distance, a road profile of the ground indicating the object on the ground at the location of the vehicle, the road profile indicating a vertical model of the ground. The data processing system can provide the road grade data and the road friction data to the controller of the one or more vehicles to control the component of the one or more vehicles. In some cases, the data processing system can provide the road profile of the ground to control the component of the one or more vehicles.

The data processing system can store the road height determined based on the first height of the vehicle and the second height of the vehicle in the memory. The data processing system can upload, via an interface of the vehicle in communication with a server, the road height at the location of the ground to the server. In some cases, the data processing system can receive, from the server, an instruction to control the component of the vehicle in response to the server processing the road height at the location on the ground. The data processing system can provide the instruction to the controller of the one or more vehicles to cause the controller to control the component of the one or more vehicles based on the instruction.

At least one aspect is directed to a method of controlling components of a vehicle. The method can be performed by the vehicle including a data processing system including one or more processors and memory. The method can include receiving, by the data processing system, via an inertial measurement unit ("IMU") on the vehicle that measures at a frequency of at least 100 Hertz, vertical acceleration data, angular velocity data, and lateral acceleration data. The method can include receiving, by the data processing system, via a first range sensor on the vehicle that measures at the frequency and is located on a lateral axis of the vehicle with the IMU, first vertical displacement data corresponding to a distance between the first range sensor and a first portion of a ground that contacts a first tire of the vehicle. The method can include receiving, by the data processing system, via a second range sensor on the vehicle that measures at the frequency and is located on the lateral axis of the vehicle with the IMU, second vertical displacement data corresponding to a distance between the second range sensor and a second portion of the ground that contacts a second tire of the vehicle. The method can include receiving, by the data processing system, via a positioning sensor on the vehicle, location data of the vehicle, and altitude data of the vehicle. The method can include determining, by the data processing system, a vertical vehicle body height based on fusing the vertical acceleration data and the altitude data. The method can include determining, by the data processing system, a vehicle roll angle based on fusing the vertical acceleration data, the angular velocity data, and the lateral acceleration data. The method can include determining, by the data processing system, a first height of a first side of the vehicle and a second height of a second side of the vehicle based on a track width of the vehicle, the first vertical displacement data, the second vertical displacement data, the vertical vehicle body height, and the vehicle roll angle. The method can include determining, by the data processing system, a road height at the location on the ground based on the first height of the first side of the vehicle and the second height of the second side of the vehicle. The method can include providing, by the data processing system, the road height to a controller of the one or more vehicles to cause the controller to control a component of the one or more vehicles based on the road height.

The method can include receiving, by the data processing system, via at least one imaging sensor on the vehicle, a road image and lateral deviation data at the location of the vehicle. The method can include determining, by the data processing system, based on the road image, road grade data and road friction data of the ground. The method can include detecting, by the data processing system, using an image processing technique, a lane of the ground at the location of the vehicle and an object on the ground based on the road image, the object comprising a type of obstruction on the ground. The method can include determining, by the data processing system, based on the lateral deviation data, a lateral distance indicating the location of the vehicle from a center of the lane. The method can include generating, by the data processing system, based on the lane of the ground and the lateral distance, a road profile of the ground indicating the object on the ground at the location of the vehicle, the road profile indicating a vertical model of the ground. The method can include providing, by the data processing system, the road grade data and the road friction data to the controller of the one or more vehicles to control the component of the vehicle. In some cases, the method can include providing, by the data processing system, the road profile of the ground to control the component of the one or more vehicles.

The method can include storing, by the data processing system, the road height determined based on the first height of the vehicle and the second height of the vehicle in the memory. The method can include uploading, by the data processing system, via an interface of the vehicle in communication with a server, the road height at the location of the ground to the server. In some cases, the method can include receiving, by the data processing system, from the server, an instruction to control the component of the vehicle in response to the server processing the road height at the location on the ground. The method can include providing, by the data processing system, the instruction to the controller of the one or more vehicles to cause the controller to control the component of the one or more vehicles based on the instruction.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, systems, methods, and apparatus for inspecting a tank containing a flammable fluid. The various concepts introduced above and discussed in greater detail below may be implemented in any of numerous ways.

This technology is directed to systems, methods, and apparatus for controlling components of a vehicle. The system can include a vehicle having a data processing system including one or more processors and memory. The vehicle can operate autonomously, semi-autonomously, or manually by an operator. The vehicle can be equipped or installed with multiple sensors to receive, collect, or otherwise sense road data, vehicle data, and other sensor data for assisting with advanced driver assistance systems ("ADAS") of the vehicle. The sensors can be mounted on, attached to, or embedded in the vehicle based on functionalities respective to each sensor. In some cases, at least one sensor can be mounted on the vehicle with respect to at least one other sensor to cooperate in collecting sensor data. While the vehicle travels on the road, the sensors can collect information on the characteristics of the vehicle and surface data of the road. The data processing system of the vehicle can process the information collected by the sensors. By processing the collected information, the data processing system can determine a road height at the location of the vehicle, detect the lane used by the vehicle, detect one or more obstructions and objects on the road, and generate a road profile during the drive. The data processing system can provide the processed information (e.g., road height, lane, and obstructions on the road) to a controller of the vehicle. Subsequently, the controller of the vehicle can control one or more components of the vehicle based on processing the collected information, such as the vehicle data and the road data.

Thus, systems, methods, and apparatus of this technical solution can control components of the vehicle based on the sensor data collected by sensors mounted on the vehicle and processed by the data processing system. Accordingly, by processing the sensor data and providing the processed information to the controller, the system can control one or more components of the vehicle to improve the ADAS, efficiency, and control of the vehicle, enhancing the safety of drivers and passengers.

Figure 1:
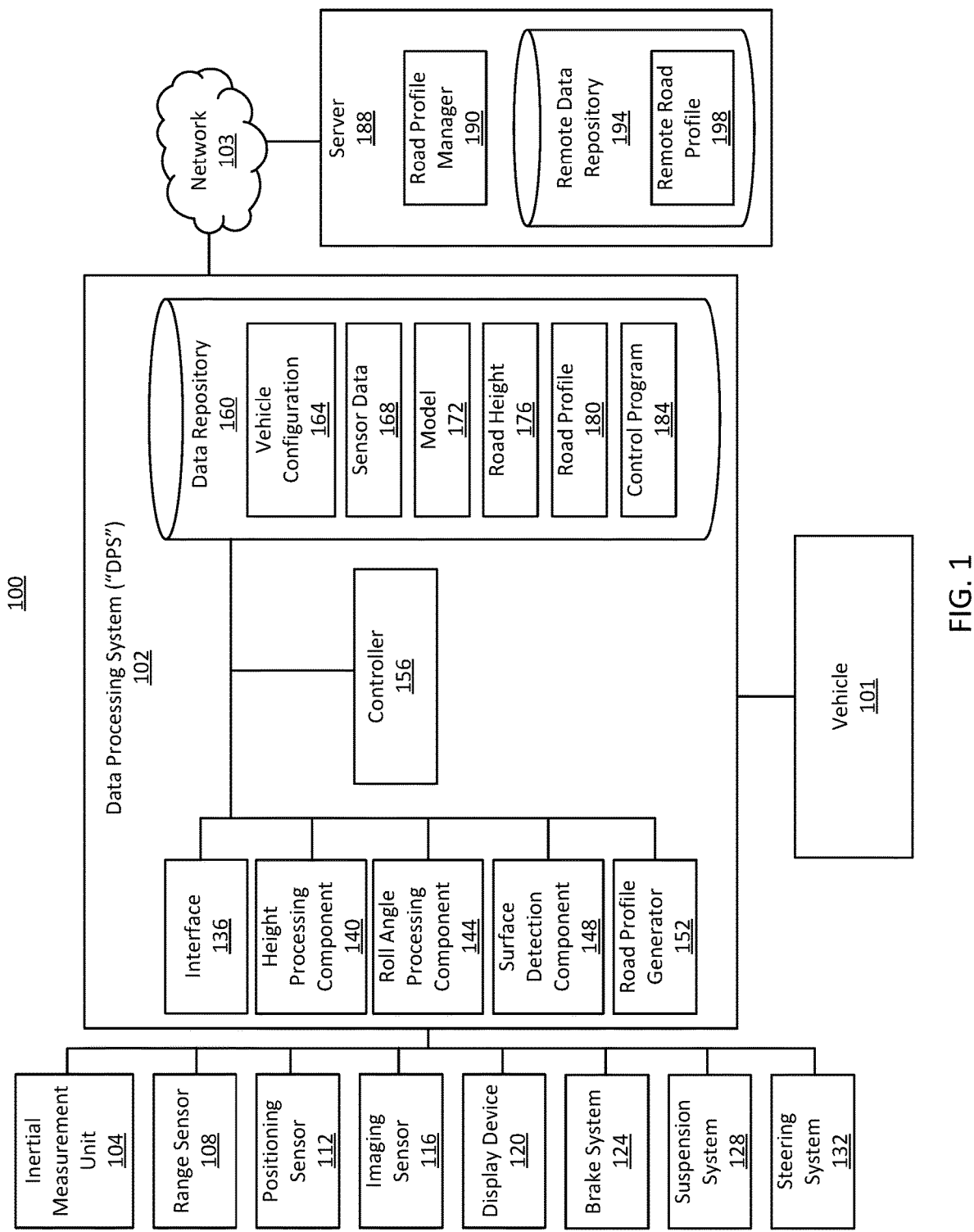
FIG. 1 is a block diagram of an example system to control components of a vehicle, in accordance with an implementation.

Referring now to FIG. 1, a block diagram of an example system to control components of a vehicle, in accordance with an implementation, is shown. The system 100 can include a vehicle 101, a data processing system ("DPS") 102 electrically connected to the vehicle, a network 103, and a server 188. The system 100 can include multiple sensors and multiple vehicle systems electrically connected to the vehicle 101 and the DPS 102. The DPS 102 can control one or more components of the vehicle 101 via at least one of the systems of the vehicle 101. The sensors can include at least one inertial measurement unit ("IMU") 104, at least one range sensor 108, at least one positioning sensor 112, and at least one imaging sensor 116. The vehicle systems can include at least a display device 120, a brake system 124, a suspension system 128, a steering system 132, and other advanced driver assistance systems ("ADAS"). The DPS 102 can connect to the server 188 via the network 103. Connection to the server enables the DPS 102 to upload data (i.e., data packets, information, and files) to and download data from the server.

The DPS 102 can include an interface 136, a height processing component 140, a roll angle processing component 144, a surface detection component 148, a road profile generator 152, a controller 156, and a data repository 160. The data repository 160 can store vehicle configuration 164, sensor data 168, model 172, road height 176, road profile 180, and control program 184. Each of the components of the DPS 102 can be electrically connected to other components of the DPS 102. The DPS 102 may include one or more additional components to perform, execute, or operate the features of the system 100 described hereinafter.

Each of the components of the system 100, including the DPS 102, the sensors, and the vehicle systems, can be implemented using hardware or a combination of software and hardware. The IMU 104, the range sensor 108, the positioning sensor 112, and the imaging sensor 116 may be referred to generally as sensors of the system 100. The sensors of the system 100 can also include built-in sensors of the vehicle 101. The display device 120, the brake system 124, the suspension system 128, and the steering system 132 may be referred to generally as vehicle systems or a part of the ADAS. Each component of the system 100 can include logical circuitry (e.g., a central processing unit or CPU) that responds to and processes one or more instructions fetched from a memory unit (e.g., memory, storage device, or data repository 160). Each component of the system 100 can include or use a microprocessor or a multi-core processor. A multi-core processor can include two or more processing units on a single computing component. Each component of the system 100 can be based on any of these processors, or any other processor capable of operating as described herein. Each processor can utilize instruction level parallelism, thread level parallelism, different levels of cache, etc. For example, the system 100 can include at least one logic device such as a computing device or server having at least one processor.

The components or elements of the system 100 can be one or more separate components, a single component, or a part of the DPS 102. In one example, the IMU 104 (or the other components of the system 100) can include one or more combinations of hardware and software, such as one or more processors configured to receive sensor data to be processed by the DPS 102. In another example, the controller 156 (or the other components of the DPS 102) can include one or more combinations of hardware and software, such as one or more processors configured to control at least one component or system of the vehicle 101, such as the brake system 124, suspension system 128, or the steering system 132. The one or more components can work individually external to the DPS 102. The one or more components can work cooperatively with other components within the system 100.

The components of the system 100 in connection with the vehicle 101 can be implemented or connected to one or more vehicles. In other words, one or more vehicles can include components similar to components of the system 100 connected to the vehicle 101. The one or more vehicles can operate similar to the vehicle 101. The operation includes data collection, processing, transmission, reception, etc. The one or more vehicles may include different configurations from the vehicle 101, such as make, model, track width, or type of vehicle 101. Data from the vehicle 101 can be processed by the DPS 102 or the server 188 for controlling the one or more vehicles. For example, the vehicle 101 can collect and process sensor data. The DPS 102 of the vehicle 101 can process the sensor data to determine a road height. In some cases, the DPS 102 can transmit the sensor data to the server 188 for processing to determine a road height. The road height can be used by the DPS 102 or the server 188 to generate a road profile including the road height, road grade, and road friction information. In the case that the DPS 102 generated the road profile, the DPS 102 can transmit the road profile to the server 188 via a network 103. The road profile can be associated with a location of the vehicle 101 (e.g., the location where the vehicle 101 obtain the sensor). The road profile information can be transmitted, from the server 188, via a network 103, to one or more vehicles different from the vehicle 101. The server 188 can perform wide-area distribution to the one or more vehicles based on, for example, a radius from the location of the vehicle 101, a zip code, a radius from the location of the server 188, or other area associated with the location of the vehicle 101. In another example, the server 188 can select one or more vehicles to transmit the road profile to based on the one or more vehicles approaching the location of the vehicle 101. The one or more vehicles can transmit, based on the road height, the road grade, or the road friction included in the road profile, instructions to a vehicle control system associated with each of the one or more vehicles. For generalization, the road profile generated based on sensor data from the vehicle 101 can be used by the vehicle 101 to control at least one component of the vehicle system. In some cases, the server 188 can generate a road profile based on sensor data from the vehicle 101, and transmit the road profile to the vehicle 101 to process in real-time.

The one or more component of the system 100 can be hosted on or within a vehicle 101. The components of the system 100 can be connected or communicatively coupled to one another. The connection between the various components of the system 100 can be wired or wireless, or any combination thereof.

The vehicle 101 can include an IMU 104. The IMU 104 can be located or mounted on the center of a lateral axis of the vehicle 101. The IMU 104 can be mounted under the vehicle 101, embedded in a part of the vehicle 101, or attached to a side of the vehicle 101 at the center of the lateral axis. The IMU 104 can be located at a distal end of a longitudinal axis, a proximal end of the longitudinal axis, or in between the distal end and the proximal end of the vehicle 101. The distal end and the proximal end can be referred to in at least FIG. 2A. The lateral axis of the vehicle 101 can refer to an axis of the vehicle 101 perpendicular to a direction of the vehicle 101 when moving forward or backward. The longitudinal axis can refer to an axis perpendicular to the lateral axis or parallel to the direction of the vehicle 101 when moving forward. The mounting location of the IMU 104 can be illustrated at least at FIGS. 2A-F. The IMU 104 can operate at a frequency of at least 100 Hertz ("Hz"), such as 120 Hz, 140 Hz, or 160 Hz. In some cases, the IMU 104 can operate at a frequency of less than 100 Hz, such as 90 Hz, 80 Hz, 70 Hz or some other frequency. The IMU 104 can measure, detect, or otherwise sense vertical acceleration, angular velocity, and lateral acceleration of the vehicle 101 (i.e., vertical acceleration data, angular velocity data, and lateral acceleration data, respectively). The vertical acceleration data, the angular velocity data, and the lateral acceleration data can be referred to generally as acceleration data collected by the IMU 104.

The vertical acceleration data can indicate a changing rate of the vertical velocity of the body of the vehicle 101 at the location of the IMU 104. The vertical acceleration data can be positive as velocity increases in an upward direction and negative as velocity increases in a downward direction, or vice versa. The angular velocity data can indicate a changing rate of a roll angle of the vehicle (i.e., the rotational motion of the body of the vehicle 101). The angular velocity data can be positive as the vehicle 101 rotates clockwise and negative as the vehicle 101 rotates counterclockwise or anticlockwise direction. The indication of the positive velocity and the negative velocity can be interchangeable, based on the orientation of the IMU 104 mounted on the vehicle 101. The lateral acceleration data can indicate the changing rate of a side-to-side velocity of the body of the vehicle 101. The lateral acceleration data can be positive as lateral velocity increase towards the right side and negative as lateral velocity increase towards the left side, or vice versa.

The IMU 104 can transmit the acceleration data to the DPS 102. The DPS 102 can receive the acceleration data, and store the acceleration data in a data repository 160. For example, the IMU 104 can detect close to zero vertical acceleration, angular velocity, and lateral acceleration during a trip with constant velocity on a smooth road surface without turning the vehicle 101. In further example, the right side of the vehicle 101 can dip into a pothole, causing the vehicle 101 to rotate clockwise, move downward, and steer to the right side. In this example, the vertical acceleration data can indicate a negative vertical acceleration, the angular velocity data can indicate a positive angular velocity, and the lateral acceleration data can indicate a positive lateral acceleration.

In some implementations, the IMU 104 can be substituted with at least an accelerometer and a gyroscope. The accelerometer can behave similarly to at least one functionality the IMU 104 to measure the vertical acceleration and the lateral acceleration of the body of the vehicle 101. The gyroscope can behave similarly to at least one other functionality of the IMU 104 to measure the angular velocity of the body of the vehicle (i.e., the roll of the vehicle 101). The accelerometer and the gyroscope can be coupled or conjugated at a center of a lateral axis of the vehicle 101 to measure the vertical acceleration, the angular velocity, and the lateral acceleration at the same location of the vehicle 101 as the IMU 104. In some cases, the accelerometer and the gyroscope may be separate components, operating independently from the other.

In some implementations, the IMU 104 can measure vertical velocity data, angular velocity data, and lateral velocity data of the body of the vehicle 101. The vertical velocity data, angular velocity data, and lateral velocity data may be referred to as velocity data measured by the IMU 104. The IMU 104 can measure the velocity data in addition to the acceleration data. The velocity data can indicate the speed of the vertical, angular, and lateral motion of the vehicle 101. In some cases, the acceleration data can be converted to velocity data using a data conversion technique or equation. In some implementations, the IMU 104 can measure vertical acceleration data, angular acceleration data, and lateral acceleration data of the body of the vehicle 101. The vertical acceleration data, angular acceleration data, and lateral acceleration data may be referred to as acceleration data measured by the IMU 104. In some cases, the vertical data can be converted to acceleration data using a data conversion technique.

The vehicle 101 can include at least one range sensor 108. The range sensor 108 can be an ultrasonic sensor, a laser sensor, a light detection and ranging ("LiDAR") sensor, an infrared sensor, or other sensors. The range sensor 108 can be mounted or located on a lateral axis of the vehicle 101 with the IMU 104. The range sensor 108 can be mounted on the vehicle 101 to be directed or pointed towards a center tread width of the wheel in contact with the ground. The wheel of the vehicle 101 can be referred to as a tire of the vehicle 101. For example, the range sensor 108 can be mounted at the center tread width of a tire of the vehicle 101. The vehicle 101 can include a range sensor 108 corresponding to each wheel of the vehicle 101, such as a first range sensor for the left wheel and a second range sensor for the right wheel. The range sensor 108 can measure a distance between the range sensor 108 and a portion of the ground that contacts a wheel of the vehicle 101. In some cases, the ground can be referred to as road, floor, surface, or platform. In some other cases, the ground can refer to the crust of the earth below a road surface. The range sensor 108 can be mounted lower than the IMU 104. Examples of the mounting positions of the range sensor 108 can be illustrated at least at FIGS. 2A-F.

The range sensor 108 can measure a vertical displacement of a wheel. The range sensor 108 can operate at a frequency similar to the operation frequency of the IMU 104 (e.g., 100 Hz, 120 Hz, or 140 Hz). The range sensor 108 can measure the vertical displacement data at a resolution of less than 5 millimeters. The vertical displacement can correspond to a distance between the range sensor 108 and a portion of the ground that contacts the wheel of the vehicle 101. The range sensor 108 can be located adjacent to the center tread width of the wheel, such as to measure a travel path of the wheel. The vertical displacement between the range sensor 108 and the ground can be similar to or indicate a vertical displacement between a side of the vehicle 101 and the ground. The range sensor 108 can transmit the vertical displacement data to the DPS 102.

In some implementations, the vehicle 101 can include two range sensors. Each of the two range sensors can be mounted adjacent to the center tread width of a wheel of the vehicle 101. The two range sensors can perform similar operations at different locations. For example, vehicle 101 can include a first range sensor and a second range sensor. The first range sensor can be mounted adjacent to a center tread width of a left wheel of the vehicle 101. The first range sensor can measure a first vertical displacement between the first range sensor and a first portion of the ground that contact the left wheel of the vehicle 101. The second range sensor can be mounted adjacent to a center tread width of a right wheel of the vehicle 101. The second range sensor can measure a second vertical displacement between the second range sensor and a second portion of the ground that contact the right wheel of the vehicle 101. The left wheel can be referred to as a first tire or a first wheel. The right wheel can be referred to as a second tire or a second wheel. The first vertical displacement and the second vertical displacement can indicate a body height of the left side and the right side of the vehicle 101 with respect to the road surface, respectively. The first range sensor and the second range sensor can transmit the first vertical displacement data and the second vertical displacement data to the DPS 102.

The vehicle 101 can include a positioning sensor 112 to determine the location of the vehicle 101 and an altitude at the location of the vehicle 101. The positioning sensor 112 can be mounted on, embedded in, or attached to the vehicle 101. The positioning sensor 112 can include a differential global positioning system ("GPS"), a real-time kinematic ("RTK") GPS, or other sensors to locate the vehicle 101. The positioning sensor 112 can detect the location of the vehicle 101. Subsequently, the positioning sensor 112 can transmit the location data to the DPS 102. The altitude data of the vehicle 101 can be derived from the location data transmitted by a satellite. The location data can indicate the location of the vehicle 101 with localization of less than 0.5 meters.

The positioning sensor 112 can be connected to or in communication with a base station. The positioning sensor 112 can transmit or receive location data from the satellite to or from the base station. For example, the positioning sensor 112 can receive first location data from at least one satellite. The positioning sensor 112 can transmit the first location data from the at least one satellite to a base station. The base station can receive the first location data from the positioning sensor 112, and correct the reported location of the vehicle 101. The correction to the reported location of the vehicle 101 can be based on a signal received from a satellite at the location of the base station. Based on the location data from the positioning sensor 112 and the signal from the satellite, the base station can correct the location data by applying a difference between the two locations. The base station can generate a second location data including the corrected location of the vehicle 101. The base station can transmit the second location data to the positioning sensor 112. The positioning sensor 112 can transmit the second location data to the DPS 102. In some cases, the base station can be connected to the DPS 102 via a network 103. In this case, the based station can transmit the second location data directly to the DPS 102.

In some implementations, the vehicle 101 can include multiple positioning sensors 112, such as a combination of a differential GPS and an RTK GPS. The differential GPS and the RTK GPS can operate independently as separate systems or synchronously detect the location of the vehicle 101. The differential GPS and the RTK GPS can receive location data from the same satellite. In some cases, the differential GPS and the RTK GPS can receive location data from different satellites. The differential GPS and the RTK GPS can transmit their respective location data to the DPS 102. The DPS 102 can average or combine the location data from the differential GPS and the RTK GPS. Otherwise, the DPS 102 can select the location data from either the differential GPS or the RTK GPS. The selection of the location data can be based on the location with higher accuracy localization determined by the base station. For example, the positioning sensors can send first location data of the differential GPS and second location data of the RTK GPS to the base station. The base station can process the location data from each positioning sensor 112, similar to the DPS 102, as described above. The base station can process the first location data and the second location data in combination with a signal received from a satellite at the base station to determine if the first location data or the second location data is more accurate. The base station can transmit an indication of the more accurate location data to the DPS 102.

The vehicle 101 can include at least one imaging sensor 116. The imaging sensor 116 can include an infrared camera or other digital cameras. The imaging sensor 116 can be mounted on the vehicle 101 to record, detect, or sense images of the road. The mounting location of the imaging sensor 116 can be on the roof, adjacent to the windshield, at the rear-view mirror facing the front of the vehicle 101, the hood, or other front portion of the vehicle 101. For example, the mounting location of the imaging sensor 116 can be shown at least at FIGS. 2A-B. The imaging sensor 116 can transmit image data including the images of the road to the DPS 102. The image data can be referred to as, or used interchangeably with other descriptive terms, such as visual data, imaging data, or optical signal. The imaging data can be used by the DPS 102 to determine or identify at least the lane on the road the vehicle is currently in and a lateral deviation of the vehicle 101. The lateral deviation can indicate a distance of the vehicle 101 from the center of the lane of the road. The DPS 102 can combine or merge lane data and lateral deviation data of the vehicle 101 with the location data. The combination of these data can improve the localization accuracy of the location of the vehicle 101.

The data from each of the sensors can include timestamps indicating a time of the data measurement with respect to each sensor. For example, when detecting the location of the vehicle 101, the positioning sensor 112 can receive timestamp from the satellite. Therefore, the positioning sensor 112 can transmit the location data including the location of the vehicle 101 and timestamp to the DPS 102. The timestamp can be applied to other data transmitted to the DPS 102, such as the vertical acceleration data, the angular velocity data, the lateral acceleration data, the vertical displacement data, the lane data, and the lateral deviation data. These data can include additional information for processing the data, such as make and model of each sensor corresponding to the detected or measured data.

The vehicle 101 can include a display device 120. The display device 120 can be embedded or mounted inside the vehicle 101. The display device can be mounted at the dashboard or other location accessible by the driver of the vehicle 101. A pad or other mounting component can be used to mount the display device 120 in the vehicle 101. The driver or operator can operate and visualize collected sensor data via the display device 120. The display device 120 can be a touchscreen device with interactive elements for drivers to operate. The display device 120 can display at least one notification in response to receiving an alert from the DPS 102. The alert can include updates to a software component of the system 100 or a request to upload collected data stored in the memory of the vehicle 101 to the server 188.

In some implementations, the display device 120 can receive a notification to display a road profile generated by the DPS 102. The display device 120 can display the notification on a screen of the display device 120, requesting the operator to either accept or decline the notification. The notification can include interactive elements for interaction by the operator. The operator can interact with an interactive element of the display device 120. In response to the interaction with the interactive element, accepting the display of the road profile, the display device 120 can display the road profile generated by the DPS 102. In response to an indication declining the display of the road profile, the display device 120 can terminate the notification or return to a previous screen shown by the display device 120. In some implementations, the display device 120 can receive a notification to update a road profile map stored in the memory of the vehicle 101. The notification can be similar to the notification to display the road profile. In response to accepting the update, the display device 120 can display a loading screen indicating a download-in-progress for the update. In response to declining the update, the display device 120 can return to the previous page.

In some implementations, the vehicle 101 may be equipped with a hotspot device. The hotspot device may be embedded as part of the display device 120. The hotspot device can include a data sim card. In some cases, the display device 120 can be configured as a hotspot device. The hotspot device can provide internet connections to other devices in the proximity of the vehicle 101. In some cases, an operator of the vehicle 101 may control one or more components of the vehicle 101 via a remote device. For example, a mobile device of an operator can be connected to the DPS 102 of the vehicle 101 via the hotspot device. The DPS 102 can be accessed by the mobile device of the operator via a valid credential and one or more security checks. Based on the validation, the mobile device may access or display features of the DPS 102 similar to the display device 120. The mobile device may receive and interact with one or more interactive elements provided by the DPS 102. In some cases, the mobile device can mirror the display of the display device 120.

The vehicle 101 can include a brake system 124 (i.e., braking system) electrically or mechanically coupled to other components of the system 100. The brake system 124 can be configured by the DPS 102 based on processing sensor data from multiple sensors of the system 100. The brake system 124 can apply a frictional force to the tire to deaccelerate or decrease the velocity of the vehicle 101. The brake system 124 can increase or decrease the frictional resistance. Increasing the frictional resistance can absorb higher kinetic energy or potential energy from the vehicle 101. Decreasing the frictional resistance can absorb less energy from the vehicle 101. The frictional resistance can be adjusted based on a coefficient of friction. The coefficient of friction can consist of varying ranges, such as 0.3 to 0.5, 0.4 to 0.8, or other ranges based on a type, a model, or a configuration of the vehicle 101. The coefficient of friction can be referred to as, and used interchangeably with other terms, such as brake level or braking coefficient. Increasing the brake level can increase the frictional resistance and decreasing the brake level can decrease the frictional resistance. The brake system 124 can receive instructions from the DPS 102 to adjust the brake level of the brake system 124. For example, the DPS 102 can determine that the vehicle 101 is traveling on an inclined road. The DPS 102 can transmit an instruction to the brake system 124 to decrease a brake level of the brake system 124 based on the inclination of the road surface. In another example, the DPS 102 can determine that the vehicle 101 is traveling on a road with declined slope. In response to the determination, the DPS 102 can transmit an instruction to the brake system 124 to increase a brake level of the brake system 124. By adjusting the brake level, the system 100 can improve fuel consumption and energy consumption of the vehicle 101.

The vehicle 101 can include a suspension system 128. The suspension system 128 can be electrically or mechanically connected to other components of the system 100. The suspension system can be a semi-active suspension or an active suspension. The suspension system 128 can be configured to receive instructions from the DPS 102. Using the semi-active suspension, the suspension system 128 can receive instructions from the DPS 102 to configure a dampening level of the suspension. Increasing the dampening level of the suspension can increase the dampening force applied in an upward and a downward direction to the suspension. Decreasing the dampening level of the suspension can decrease the dampening force in both directions. For example, the DPS 102 can detect a pothole consisting of a dimension, a pothole height, and the lowest point of the pothole. At least one wheel of the vehicle 101 can dip into the pothole. Based on the detected information, the DPS 102 can provide instructions to the suspension system 128. The DPS 102 can provide a first instruction to the suspension system 128 to decrease the dampening level of the suspension at the initial contact with the pothole to allow the wheel to travel into the pothole. The DPS can provide a second instruction to the suspension system 128 to increase the dampening level when the wheel is at the lowest point of the pothole, such that the body of the vehicle 101 remains at the same elevation while the wheel is at the lowest point of the pothole. The lowest point can refer to the bottom of the pothole or a portion of the pothole having the highest vertical displacement from the road surface. The DPS 102 can provide a third instruction to the suspension system 128 to decrease the dampening level, as the vehicle 101 elevate up from the lowest point of the pothole to the road surface. Accordingly, once the wheel of the vehicle 101 is out of the pothole, the DPS 102 can transmit a fourth instruction to the suspension system 128 to increase the dampening level of the suspension. The increase of the dampening level can return the suspension to the dampening level prior to contacting the pothole.

In further example, the DPS 102 can provide instructions to the suspension system 128 having the active suspension.

The instructions can increase or decrease a height of the wheel from the body of the vehicle 101. As in the previous example, the DPS 102 can identify a pothole on the road. The DPS 102 can provide instructions to the suspension system 128 based on features of the pothole, such as dimension and depth. For example, the instructions from the DPS 102 can include increasing the height of the wheel from the vehicle 101 at an initial edge of the pothole. The instructions can include maintaining the same wheel height at the lowest point of the pothole. The instructions can include decreasing the height of the wheel, as the vehicle 101 travel pass the lowest point of the pothole towards the end of the pothole. By providing instructions to control the suspension system 128, the vehicle 101 can be obviated from experiencing contact with one or more obstructions, preventing damages to the components of the vehicle 101. Furthermore, the DPS 102 can control the suspension system 128 to increase traction and grip of the wheels to the ground, further increasing mobility and control for the vehicle 101.

The vehicle 101 can include a steering system 132. The steering system 132 can be electrically or mechanically connected to other components of the system 100. The steering system 132 can include a rack and a pinion to assist operators with the steering of the vehicle 101. The steering system 132 can be electrically connected to the DPS 102. The DPS 102 can provide instructions to the steering system 132 to control the steering of the vehicle 101. The steering system 132 can assist the steering of the operator by providing feedback to the steer based on the orientation the operator turns the steering wheel of the vehicle 101. For example, if the operator initiates a clockwise rotation to the steering wheel, the steering system 132 can provide feedback to assist with turning the steering wheels in accordance with the direction initiated by the operator. Similar procedures can be performed when turning the steering wheel in a counterclockwise direction.

In some implementations, the steering system 132 can receive instructions from the DPS 102. The instructions from the DPS 102 can command the steering system 132 to steer the vehicle 101 based on a height of the road. The road height can indicate a slope or a curvature of the road in a lateral axis of the road or a direction perpendicular to the traffic direction of the road. For example, the DPS 102 can determine a road height having a first height and a second height. The first height can correspond to the left side of the vehicle 101. The second height can correspond to the right side of the vehicle 101. The first height can be lower than the second height. The DPS 102 can determine that the curvature of the road is to facilitate turning of the vehicle 101. As such, the vehicle 101 may turn left due to the difference in height between the left side of the vehicle 101 and the right side of the vehicle 101. In this case, in response to the turn and based on the road height, the steering system 132 can steer the vehicle 101 to the left towards the lower road height. In another example, the DPS 102 can determine that there is no turn ahead, as the road includes slope or curvature similar to the previous example. Hence, the DPS 102 can provide an instruction to the steering system 132 to not steer the vehicle 101 based on the curvature of the road. Instead, the steering system 132 can provide feedback response based on an operator steering the vehicle 101.

The vehicle 101 can include built-in sensors, such as to measure velocity, yaw rate, individual wheel rotation speed, and other information of the vehicle 101. The built-in sensors can be embedded into the vehicle 101 during the manufacturing process of the vehicle 101. The built-in sensors can be electrically connected to components of the system 100. The built-in sensors can be additional sensors from the IMU 104, the range sensor 108, the positioning sensor 112, and the imaging sensor 116. Data from the built-in sensors can be transmitted to the DPS 102 for controlling at least one of the vehicle systems, such as the brake system 124, the suspension system 128, or the steering system 132. For example, built-in sensors of the vehicle 101 can measure a forward velocity of the vehicle approaching an obstruction, such as a pothole. By transmitting the velocity data of the vehicle 101 to the DPS 102, the DPS 102 can determine a first time the vehicle 101 is initially in contact with the pothole, a second time while the vehicle 101 is at the lowest point of the pothole, and a third time when the vehicle 101 is ascending from the pothole, for example. Based on the first time, the second time, and the third time, the DPS 102 of the vehicle 101 can transmit one or more instructions to at least the suspension system 128. In further example, the DPS 102 can instruct the suspension system 128 to decrease the dampening level of the suspension at the first time, increase the dampening level at the second time, and decrease the dampening level at the third time. Accordingly, the DPS 102 can utilize the built-in sensors of the vehicle 101 to facilitate the control of at least one vehicle system.

The vehicle 101 can include a DPS 102 electrically connected to other components of the system 100. The DPS 102 can control one or more components of the vehicle 101, such as the brake system 124, the suspension system 128, the steering system 132, or other ADAS to assist controlling the vehicle 101. The DPS 102 can include an interface 136, a height processing component 140, a roll angle processing component 144, a surface detection component 148, a road profile generator 152, a controller 156, and a data repository 160. The components of the DPS 102 can be a software component or a hardware component. The DPS 102 can receive and process data from sensors of the vehicle 101. The DPS 102 can display a notification, data, or any information to the user via the display device 120. The DPS 102 can receive command or instructions from an operator of the vehicle 101 via an interaction with the display device 120. The DPS 102 can control components of the system 100 based on processed sensor data and generated road profile.

In some implementations, the DPS 102 may be an intermediary device or component to transfer the collected data from the sensors to a server 188. The server 188 may be referred to as a cloud or a remote data processing system. The DPS 102 can connect to the server 188 via a network 103. For example, the DPS 102 can receive sensor data from the sensors for determining a road height. The DPS 102 can transmit the sensor data to the server 188 via the network 103. The server 188 can process the data to determine the road height. The DPS 102 can receive the road height from the server 188. Based on the road height at the location of the vehicle 101, the DPS 102 can transmit instructions to at least one vehicle system.

In some implementations, the DPS 102 can transmit the sensor data to the server 188 for determining a road height a first vehicle location for a second vehicle traveling towards the location of the first vehicle. For example, and referring in part to the example above, the server 188 can receive sensor data from the DPS 102 of a first vehicle at a location. The server 188 can process and determine a road height at the location. Responsive to determining the road height, the server 188 can transmit the road height to a second vehicle approaching the location. The second vehicle including a DPS 102, which can be similar to the DPS 102 of the first vehicle, can receive the road height from the server via the network 103. Accordingly, the second vehicle can transmit instructions to at least one vehicle system of the second vehicle based on the road height. In some cases, the second vehicle can refer to the first vehicle traveling towards the location at another point in time.

The interface 136 of the DPS 102 can provide interface between each of the components of the system 100. The transmission and reception of data can be traversed across the components of the system 100 via the interface 136. The interface 136 can include one or more ports for external connection to the DPS 102, such as a serial port, USB port, display port, Ethernet port, or Bluetooth receiver and transmitter. The one or more ports can be used to transfer one or more data to or from the data repository 160, such as the vehicle configuration 164, sensor data 168, model 172, road height 176, road profile 180, and control program 184. The interface 136 can connect the DPS 102 to the network 103.

The height processing component 140 of the DPS 102 can determine a height of the vehicle 101 with respect to the ground. In this case, the ground can refer to the earth surface below a road. The height processing component 140 can determine the height of the vehicle 101 based on the sensor data received from the sensors. The height processing component 140 can utilize raw acceleration data with biased measurement to determine the height of the vehicle 101. Additionally, the height processing component 140 can incorporate vehicle configuration data and other bias data to determine the height of the vehicle 101.

The height processing component 140 can generate a model (e.g., state-space model or other probabilistic graphical model) based on the collected data to determine the height of the vehicle 101. The generated model can be stored in model 172 of the data repository 160. The height processing component 140 can apply at least one filtering technique to the generated model the bias or noise of the data (e.g., stochastic noise). The determination of the height of the vehicle 101 can be as follows:

The following variables can be used for generating a model for determining the height.
- z: Actual vertical vehicle body height. The body height of the vehicle 101 can be retrieve from the vehicle configuration 164. Each vehicle 101 may consist of different vehicle configuration data.
- v: Actual vertical vehicle body velocity based on the vehicle configuration data.
- b: Sensor bias (e.g., from gravity, temperature, etc.). The sensor bias can vary based on multiple factors, such as age, location, or temperature of the vehicle 101.
- $a_m$: Vertical velocity data of the vehicle 101 measured by at least one sensor containing the sensor bias b. The vertical velocity data can be derived from vertical acceleration data measured by the IMU.
- $n_b$: Random noise used to model the changing rate of b. The changing rate can refer to the variation rate of the sensor bias due to factors such as gravity.
- $n_h$: Random noise used to model a measurement noise on an altitude data collected from the positioning sensor 112.
- h: Altitude data collected from the positioning sensor 112.

Based on the above variables, the height processing component 140 can generate the following model:

$$\frac{d}{dt}\begin{bmatrix}z\\v\\b\end{bmatrix}=\begin{bmatrix}0&1&0\\0&0&-1\\0&0&0\end{bmatrix}\begin{bmatrix}z\\v\\b\end{bmatrix}+\begin{bmatrix}0\\1\\0\end{bmatrix}a_m+\begin{bmatrix}0\\0\\n_b\end{bmatrix}$$

-continued $$h=[1\ 0\ 0]\begin{bmatrix}z\\v\\b\end{bmatrix}+n_h$$

The $n_b$ can be a Gaussian with zero mean, and its covariance can be determined from experimental data. The experimental data can be retrieved from, for example, a server 188 or a remote data repository 194 via a network 103. The $n_h$ can be retrieve from the sensor data sheet or determined from experimental data, similar to $n_b$. The model may include noise or other variation in the data. To remove the noise, the height processing component 140 can apply a filtering technique to the model or insert the model into a filter (e.g., Kalma filter) to remove the noise. Accordingly, based on the model and the Kalma filter, the height processing component 140 can determine the height of the vehicle 101 from the road. The height of the vehicle 101 can be used to determine a road height via a surface detection component 148. In some cases, the height processing component 140 itself can process or aggregate additional information from the sensors to determine the road height. The combination of data to generate the model and determine the height of the vehicle 101 from the road can be referred to as data fusion.

The roll angle processing component 144 of the DPS 102 can determine an actual roll angle of the vehicle 101. The roll angle processing component 144 can determine the actual roll angle by performing data fusion multiple sensor data, such as data from the IMU 104. The actual roll angle of the vehicle 101 can be derived from an initial roll angle determined by processing sensor data from the sensors. The initial roll angle can be referred to as a first roll angle. The actual roll angle of the vehicle 101 can be referred to as a second roll angle. The roll angle processing component 144 can determined the first roll angle as follows:

The roll angle processing component 144 can check gravity components on the vertical axis and the lateral axis of the vehicle. The vertical axis can refer to z-direction and the lateral axis can refer to y-direction. The vertical axis can refer to a direction from the ground to the roof of the vehicle 101. The lateral axis can refer to a direction from a left side of the vehicle 101 to the right side of the vehicle 101 when inspecting from the rear of the vehicle 101. The gravity components on the z-axis and the y-axis and a vehicle roll angle based on the lateral acceleration and the vertical acceleration can be determined by:

$$\theta_{acc}=-\tan(\ddot{y}_m/\ddot{z}_m)$$

The $\hat{y}_m$ and the $\hat{z}_m$ can indicate lowpass filtered acceleration measurements along the y-axis and z-axis of the vehicle 101, respectively. The $\theta_{acc}$ can represent the determined roll angle based on the lateral acceleration data and the vertical acceleration data. The lateral acceleration data and the vertical acceleration data can be received from the IMU 104. The lowpass filter can filter the acceleration data at a cutoff frequency of 0.5 Hz, for example. An illustration of the determination of the roll angle based on the lateral acceleration data and the vertical acceleration data can be shown in FIG. 3B.

Subsequently, the roll angle processing component 144 can determine an actual roll angle or a second roll angle of the vehicle 101 based on the first roll angle and sensor data. To determine the actual roll angle of the vehicle 101, the roll angle processing component 144 can integrate an angular velocity of the vehicle 101. The angular velocity may be received directly from the IMU 104. In some cases, the roll angle processing component 144 can integrate angular acceleration of the vehicle 101. The angular acceleration can be derived from the angular velocity of the vehicle 101 or measured directly by the IMU 104. The integration of the angular velocity of the vehicle 101 may introduce a drift. The introduced drive can be attenuated or removed by performing data fusion with the first roll angle. For example, the following variables can be defined:

θ: Actual roll angle of the vehicle 101.

$b_θ$: bias of gyroscope (i.e., the gyroscope of the IMU 104). The bias can vary incrementally based on factors, such as time, noise, and operation condition (e.g., climate, location, or altitude).

$ω_m$: Angular velocity measurement from a sensor (e.g., the IMU 104). The angular velocity measurement can contain the bias $b_θ$.

$n_b$: Random noise to model the changing rate of $b_θ$. This random noise can be determined or obtain similar to the random noise from the vehicle height determination.

$θ_{acc}$: The roll angle determined from lateral acceleration and vertical acceleration.

$n_θ$: Random noise to model $θ-θ_{acc}$.

A model (e.g., the state-space model) can be generated based on the aforementioned data to determine the actual roll angle. The model generated to determine the vehicle height may be referred to as a first model or a first state-space model. The model generated to determine the actual roll angle of the vehicle 101 may be referred to as a second model or a second state-space model. The following is the second model generated to determine the actual roll angle:

$$\frac{d}{dt}\begin{bmatrix} θ \\ b_θ \end{bmatrix} = \begin{bmatrix} 0 & -1 \\ 0 & 0 \end{bmatrix}\begin{bmatrix} θ \\ b_θ \end{bmatrix} + \begin{bmatrix} 1 \\ 0 \end{bmatrix}ω_m + \begin{bmatrix} 0 \\ n_b \end{bmatrix}$$

$$θ_{acc} = \begin{bmatrix} 1 & 0 \end{bmatrix}\begin{bmatrix} θ \\ b \end{bmatrix} + n_θ$$

The $n_b$ and ω can be Gaussian noise determined based on experimental data. The experimentation data may be retrieved from a remote data a server 188 via a network 103, for example. The roll angle processing component 144 can provide this model into a Kalman filter or apply the Kalman filter to the model to estimate θ, the actual roll angle of the vehicle 101. Thus, the roll angle processing component 144 can determine the actual roll angle of the vehicle 101 used to determine a road height at the location of the vehicle 101.

The surface detection component 148 of the DPS 102 can determine a road height based on at least the sensor data, the height of the vehicle 101 from the ground, and the roll angle of the vehicle 101. The road height can be referred to as an elevated surface from the ground. The road height can include inclination or slope, which can be referred to as road grade. An illustration of the determination of the road height can be shown in at least FIG. 3A. The surface detection component 148 can determine a road grade and a road friction based on the road height and sensor data. To determine the road height, the data represented by the following variables can be used.

L: A vehicle track width. The vehicle track width can be based on a model, a make, or a configuration of the vehicle 101. The vehicle track width can be stored and retrieved from a vehicle configuration 164.

θ: A vehicle roll angle. The vehicle roll angle may be determined by the roll angle processing component 144. The roll angle processing component 144 can process the sensor data to derive the vehicle roll angle (i.e., the actual roll angle of the vehicle 101).

z: Vertical displacement at the location of the IMU 104. The vertical displacement at this location can be referred to as a height of the vehicle 101 from the ground (i.e., the height of the vehicle 101 to a surface below the road). The vertical displacement can be determined by the height processing component 140. This vertical displacement may be referred to as a vertical vehicle body height.

$D_L$: Left range sensor measurement. The left range sensor can be referred to as a first range sensor associated with a left wheel of the vehicle 101. The first range sensor can perform functionalities similar to the range sensor 108. The first range sensor measuring a first vertical displacement at a first side (i.e., vertical displacement at the left side) of the vehicle 101. The first side can correspond to the location of the first range sensor mounted on the vehicle 101. The mounting location can be at the center tread width of the left wheel.

$D_R$: Right range sensor measurement. The right range sensor can be referred to as a second range sensor associated with the right wheel of the vehicle 101. The second range sensor measuring a second vertical displacement at a second side (i.e., vertical displacement at the right side) of the vehicle 101. The second range sensor may perform similar features and functionalities as the first range sensor on the second side of the vehicle 101. The second side can correspond to the mounting location of the second range sensor (i.e., at the center tread width of the right wheel).

$R_L$: Left side road height (i.e., first height of the road). The left side road height can be a vertical displacement from the surface of the ground to the surface of the road at the left side. The left side can be associated with the center thread width of the left wheel of the vehicle 101.

$R_R$: Right side road height (i.e., the second height of the road). The right side road height can be a vertical displacement from the surface of the ground to the surface of the road at the right side. The right side can be associated with the center thread width of the right wheel of the vehicle 101.

The surface detection component 148 can determine the road height based on the first height at the first side of the road and the second height on the second side of the road. To determine the first height and the second height of the road, the surface detection component 148 can use Z (i.e., determined by the height processing component 140) and θ (i.e., determined by the roll angle processing component 144) as follows:

$$R_L = z - \frac{L}{2}\sin(θ) - D_L\cos(θ)$$

$$R_R = z + \frac{L}{2}\sin(θ) - D_R\cos(θ)$$

However, since θ can be small value, the surface detection component 148 may determine the first height and the second height of the road using the following equation:

$$R_L = z - \frac{L}{2}\theta - D_L$$

$$R_R = z + \frac{L}{2}\theta - D_R$$

Thus, since z and θ is determined by the height processing component 140 and the roll angle processing component 144, $R_L$ and $R_R$ can be determined. The IMU 104, although does not measure z and θ directly, can measure a vertical vehicle body height between the vehicle 101 and the road surface and angular velocity of the vehicle 101. Furthermore, the sensor data from the IMU 104 may include bias. As such, a data fusion technique can be applied to the IMU 104 to remove the bias, such as via Kalman filter. The data fusion technique can refer to a technique to combine or process data from multiple sensors with an application of a filter to remove noise, bias, or other drift in the sensor data. The DPS 102 can utilize the road height data to generate a road profile of the road. The road height may be referred to as a road grade describing an incline or a slope of the road in a lateral axis. The road grade can be determined based on a derivative of the first height and the second height of the road with respect to a distance with respect to the heights. The distance of the heights can be based on the track width and the roll angle of the vehicle 101. The surface detection component 148 can include collected vehicle information, such as controller area network ("CAN") data of the vehicle to calculate vehicle speed, individual wheel spins, yaw rate, etc., to determine the road curvature, surface friction, and low-frequency road grade of the road.

In some implementations, the surface detection component 148 can include lane detection features. The surface detection component 148 can receive image data from at least one imaging sensor 116 to process via a deep learning engine, a machine learning engine, or other neural network systems. The engine or system may be referred to as technique or feature. By processing the image data via at least one machine learning engine, the surface detection component 148 can identify the lane used by the vehicle 101 in a multi-lane road. The lane detection feature of the surface detection component 148 can identify a lateral deviation of the vehicle 101 from the center of the lane. The lateral deviation can refer to a distance from the center of a lane on the road. In some implementations, the surface detection component 148 can identify obstructions on the road via the machine learning engine. The obstructions can include at least bump, pothole, curb, crack, or other objects on the road. The information determined by the surface detection component 148 may be used by the road profile generator 152 to generate a road profile including all the information of the road.

In some implementations, the surface detection component 148 can determine road friction based on the road height and the built-in sensors of the vehicle. The built-in sensor can measure wheel velocity and tire pressure of the vehicle 101. The tire pressure can affect the road friction for the vehicle 101, as lower pressure increase the friction level of the road. The tire with high pressure can experience less friction provided by the road. The friction level can change based on the tire pressure as the surface area of the tire in contact with the road increase as pressure decrease, and vice versa. The more surface area, the higher the friction affecting the vehicle 101. Additionally, an inclined road can increase the friction level experienced by the vehicle 101 due to gravitational force pushing down on the vehicle 101. By factoring the road height and the built-in vehicle sensor information, the surface detection component 148 can determine a friction level of the road via data fusion. The friction level may be referred to as a roughness level or grip level of the road.

The road profile generator 152 of the DPS 102 can generate a road profile of the road including a vertical model of the road. Generating the road profile may be referred to as mapping the road based on collected or determined information on the road. The road profile can be represented as a 2D model or a 3D model of the road. The road profile can be a 2D vertical model, corresponding to a visual representation of an operator observing the road from the vehicle 101. In some cases, the road profile can be a 2D map of an area. The 2D map may be color-coded or otherwise labeled based on the collected information on the road. The road profile may indicate a road grade based on data from the surface detection component 148 indicating a slope or an incline to of the road. The road grade can be marked via color code or text in the road profile, such as to display on the display device 120.

The road profile generator 152 can generate road profile with information determined by the surface detection component 148. For example, the road profile generator 152 can include road surface friction data in the road profile to control the brake level of the vehicle 101. The road profile generator 152 can include a low-frequency road grade (i.e., road noise) of the road to improve fuel consumption by the vehicle 101. The road noise can refer to sounds detected on the road. Higher low-frequency noise can indicate higher traffic on the road. Thus, the DPS 102 can provide instructions to the brake system 124 to adjust the brake level. For example, the brake level can be lowered in high traffic areas, as the vehicle 101 may not travel at high speed and the operator may be braking more than low traffic areas. Higher brake level, in this case, can be uncomfortable and inefficient as the operator of the vehicle 101 would be coming to an abrupt stop more often than at lower traffic areas. Therefore, taking traffic noise into consideration can increase fuel efficiency and safety and comfort for the operator.

The road profile generator 152 can generate a road profile with an indication of a road height at the location of the vehicle 101. The road height can be used by the DPS 102 to control the steering system 132 of the vehicle 101. Based on the curvature of the road, the DPS 102 may provide assistance or resistance for the steering direction of the vehicle 101. For example, the left side of the road can be lower than the right side of the road, indicating an upward slope from the left side to the right side of the road. Based on the inclination, the vehicle 101 can be induced to turn left towards the lower side of the road. If the road profile indicates a left turn, the controller 156 of the DPS 102 can assist the vehicle 101 with the turning left. However, if the road profile indicates a straight road without a turn, the DPS 102 may resist the turn induced by one side of the road being lower than the other side of the road.

In some implementations, the road profile generator 152 can generate a road profile based on the road height determined at the location on the ground by the surface detection component 148. The road profile can be stored in road profile 180 of the data repository 160. The DPS 102 can provide a notification to the display device 120 of the vehicle 101 requesting confirmation from an operator to display the road profile. The DPS 102 can provide the road profile for display at the display device 120 responsive to receiving an indication of interaction from the operator via an interactive element. In some implementations, the DPS 102 can provide a notification to the display device 120 requesting to update the road profile stored in the road profile 180. The update can be based on an updated road profile from a server 188. The updated road profile can be from a second generated road profile from a second vehicle at a second location. For example, a second vehicle at a location can generate a road profile based on the road height at the second location. The second vehicle can transmit the road profile (i.e., updated road profile) to a server 188 via a network 103. The server 188 can receive and store the road profile from the second vehicle to update a road profile of vehicles traveling to the location of the second vehicle. In further example, the server 188 can determine that a first vehicle is approaching the location recorded at the second vehicle. Subsequent to the determination, the server 188 can transmit an update to the first vehicle. The vehicle 101 may update the road profile automatically or manually via the display device.

In some implementations, the road profile can be combined with a map from a map provider. In such cases, the map can be updated with road surface data, centralized and accessible to multiple vehicles. For example, the vehicle 101 may control the vehicle system based on the road profile combined with the map. The vehicle 101 may update the road profile of the map in response to new information received by the sensors of the vehicle 101. The update may be propagated to other vehicles accessing the map with the road profile.

In some implementations, the vehicle 101 can compare or match a first road profile stored in the road profile 180 with a second road profile stored in the remote road profile 198 managed by the server 188. The comparison can be to improve the localization of the road profile at the location of the vehicle 101 based on the location data. For example, the server 188 may store a first road profile at a location in the remote road profile 198, which can be generated from multiple road profiles received from multiple vehicles. The vehicle 101 may be approaching the location similar to the expected road profile stored by the server 188. The DPS 102 of the vehicle 101 can generate a second road profile at the location stored in the road profile 180. The DPS 102 can receive the first road profile from the server 188 to compare with the second profile. Based on the comparison of features detected in both road profiles, the DPS 102 can determine that the road profile of the vehicle 101 has drifted or errored by a distance. Thus, by matching the live measured road profile from the vehicle 101 and an expected road profile from the server 188, the DPS 102 or the server 188 can improve localization of the road profile.

In some implementations, the road profile generator 152 can generate a road profile with an indication of a lane the vehicle 101 is traveling on. The road profile can include one or more obstructions on the road. The lane and the one or more obstructions can be detected by the surface detection component 148 including lane detection features. In some cases, the road profile generator 152 may not include one or more obstructions distant from the path of the vehicle 101, such as to reduce the processing power used by the DPS 102. For example, the surface detection component 148 can identify curbs on both sides of the road and an obstruction beyond the curbs. Based on the obstruction located further from the curb, which may be inaccessible by the vehicle 101, the road profile generator 152 may not label the obstruction to reduce resources for generating the road profile. For example, the road profile generator 152 can generate, based on the lane of the ground and the lateral distance of the vehicle 101 from the center of the road, a road profile of the ground. The road profile can include an indication of the object on the ground at the location of the vehicle 101. The road profile can be configured to display or indicate a vertical model of the ground. In this case, the ground can be referred to as a road surface.

The controller 156 of the DPS 102 can transmit instructions to vehicle systems, such as the brake system 124, the suspension system 128, and the steering system 132. The controller 156 can provide instructions to at least one of the vehicle systems based on the sensor data, the road height, and the road profile at the location of the vehicle 101. The instructions for the vehicle systems can be stored in control program 184 of the data repository 160. The instructions can include adjusting the brake level of the brake system 124, the dampening level of the suspension system 128 (e.g., for semi-active suspension), a height level of the suspension system 128 (e.g., for active suspension), a steering direction and resistance of the steering system 132. The controller 156 may process data received from the components of the DPS 102 and the sensor to determine an instruction to provide to a vehicle system. For example, the DPS 102 can determine that a vehicle 101 is approaching a pothole. The controller 156 can access the control program 184 to retrieve an instruction corresponding to a "pothole" detection. Based on a data structure of the control program 184, the controller 156 can receive an instruction to decrease the dampening level at the location of the pothole.

In some implementations, the controller 156 can relay instructions from the server 188 to the vehicle systems. For example, the DPS 102 can send sensor data to the server 188 via the network 103 for processing the sensor data. The sensor data including built-in sensor data of the vehicle 101. The server 188 can determine a road height and generate a road profile based on the sensor data. Based on the road height or the road profile, the server 188 can provide an indication of instruction for the controller 156. In response to the indication, the DPS 102 can transmit the instruction corresponding to the indication to at least one of the vehicle systems.

The data repository 160 of the DPS 102 can include vehicle configuration 164, sensor data 168, model 172, road height 176, road profile 180, and control program 184. The vehicle configuration 164 can store data related to configurations of the vehicle 101. The configurations can include a make, a model, a track width, fuel efficiency rating, versions of the vehicle systems, or any information specific to the vehicle 101. The sensor data 168 can store sensor data measured by built-in sensors of the vehicle 101, the IMU 104, the range sensor 108, the positioning sensor 112, and the imaging sensor 116. The built-in sensor can include the speed of the vehicle 101, wheel rotation speed, brake level, dampening level, or any data related to the vehicle system or mobility of the vehicle 101. The model 172 can include a state-space model generated by the height processing component 140 and the roll angle processing component 144. The state-space model can include sensor data, built-in sensor data, and bias measurement. The height processing component 140 and the roll angle processing component 144 can store their respective state-space model in model 172. The model 172 can be accessed by the surface detection component 148 to determine a road height, a road grade, and a road friction level, for example.

The road height 176 can store multiple road heights determined by the surface detection component 148 at various locations passed by the vehicle 101. The road height data can be accessed by the road profile generator 152 to generate a road profile. In some cases, the DPS 102 can transmit data from the road height 176 to the server for generating or updating the remote road profile 198. The road profile 180 can store road profiles generated by the road profile generator 152. The road profile 180 can include information and labels related to the road surface. The information can include road heights, road grades, and road frictions at multiple locations traveled pass by the vehicle 101. The labels can include marks of potholes, bumps, curbs, or other obstructions on the road. The control program 184 can include a data structure of instructions to be provided to one or more vehicle systems based on sensor data, road height, or road profile at one or more locations of the vehicle 101. The data structure can include a hash table correlating an instruction with a characteristic of the road surface. For example, an indication of a curved road can correspond to one or more instructions to control the steering system 132. The one or more instructions can include assisting the steering direction of the steering wheel and resisting the steering direction of the steering wheel, such as based on the curvature (i.e., road grade) of the road.

The system 100 can include a server 188 connected to the DPS 102 via a network 103. The server 188 can include at least a road profile manager 190 and a remote data repository 194. The remote data repository 194 can include remote road profile 198. The road profile manager 190 can manage incoming and outgoing road profiles. The server 188 can perform one or more similar features and functionalities as one or more components of the DPS 102, such as the height processing component 140, the roll angle processing component 144, the road surface detection component 148, and the road profile generator 152. The server 188 can receive data from the DPS 102 for processing. The server 188 can determine a road height at a location of the vehicle 101 and generate a road profile similar to the DPS 102.

The road profile manager 190 may accept or discard road profile from the vehicle 101. For example, the road profile manager 190 can determine that the incoming road profile is identical to the current road profile at a location of the vehicle 101. In response to this determination, the road profile manager 190 may not update the remote road profile 198 and discard the incoming road profile data. The road profile manager 190 may also discard incoming road profiles based on the inaccuracy of the road profile in comparison to the road profiles (e.g., from multiple vehicles) stored in the remote road profile 198. In another example, the road profile manager 190 can send at least one road profile from the remote road profile 198 to one or more vehicles in response to an update to a road profile. The road profile manager 190 can determine to send an update based on a threshold of minor updates (e.g., recorded cracks on a location, drought stricken areas, flooded area, lane constructions, etc.). The threshold can refer to the number of minor updates used by the road profile manager 190 to send an update to one or more vehicles. For example, the threshold can be a predetermined number, such as 50, 100, or 200 minor updates. In another example, the threshold can refer to a determination of risk towards the safety, comfort level for operators, or probability of damages to one or more vehicles at various locations. In some cases, the road profile manager 190 can transmit an updated road profile to update the vehicle 101 based on the vehicle 101 having an outdated road profile. For example, the vehicle 101 may store an old road profile having an obstruction at a location. The server 188 can determine that an updated road profile does not include the obstruction. Accordingly, the server 188 can transmit the updated road profile to the vehicle 101.

The remote data repository 194 can be referred to as a centralized data repository. The remote data repository 194 can include features similar to the data repository 160 of at least the vehicle 101. The remote road profile 198 can include similar features to the road profile 180 of at least the vehicle 101. In some cases, the road profile 180 of the vehicle 101 can be mapped or synced to the remote road profile 198 with the latest updated information. The remote road profile 198 can store road profiles of multiple vehicles. The road profile manager 190 can determine to store new information from a vehicle 101 and send updates to other vehicles based on relevancy or importance of the new information to the status and location of each of the other vehicles. The relevancy or importance can be determined based on the locations of the other vehicles and the road surface condition.

Referring to FIGS. 2A-F, example illustrations of mounting locations of sensors on a vehicle are shown, in accordance with an implementation. The illustration 200 can include multiple sensors, such as sensors 204, 208, 212, 216, 220, and 224. Sensor 204 can refer to an IMU 104, sensor 208 and sensor 212 can refer to a first range sensor and a second range sensor, sensor 216 can refer to a positioning sensor 112, and sensor 220 and sensor 224 can refer to a first imaging sensor 220 and a second imaging sensor 224. The sensors 204, 208, 212, 216, 220, and 224 can perform similar functionalities and features as the sensors shown in FIG. 1. The illustration 200 can include lateral axis 236 indicating an axis from the left side to the right side of the vehicle 101. The illustration 200 can include a longitudinal axis 240 indicating an axis from the front of the vehicle 101 to the rear of the vehicle 101 or from a distal end 244 to a proximal end 248 of the vehicle 101. The distal end 244 of the vehicle 101 can be referred to as the front of the vehicle 101. The proximal end 248 of the vehicle 101 can be referred to as the rear of the back of the vehicle 101. The illustration 200 can illustrate the center tread width of the wheels of the vehicle 101, such as the center tread width 228 of a left wheel of the vehicle 101 and the center tread width 232 of the right wheel of the vehicle 101.

Figure 2A:
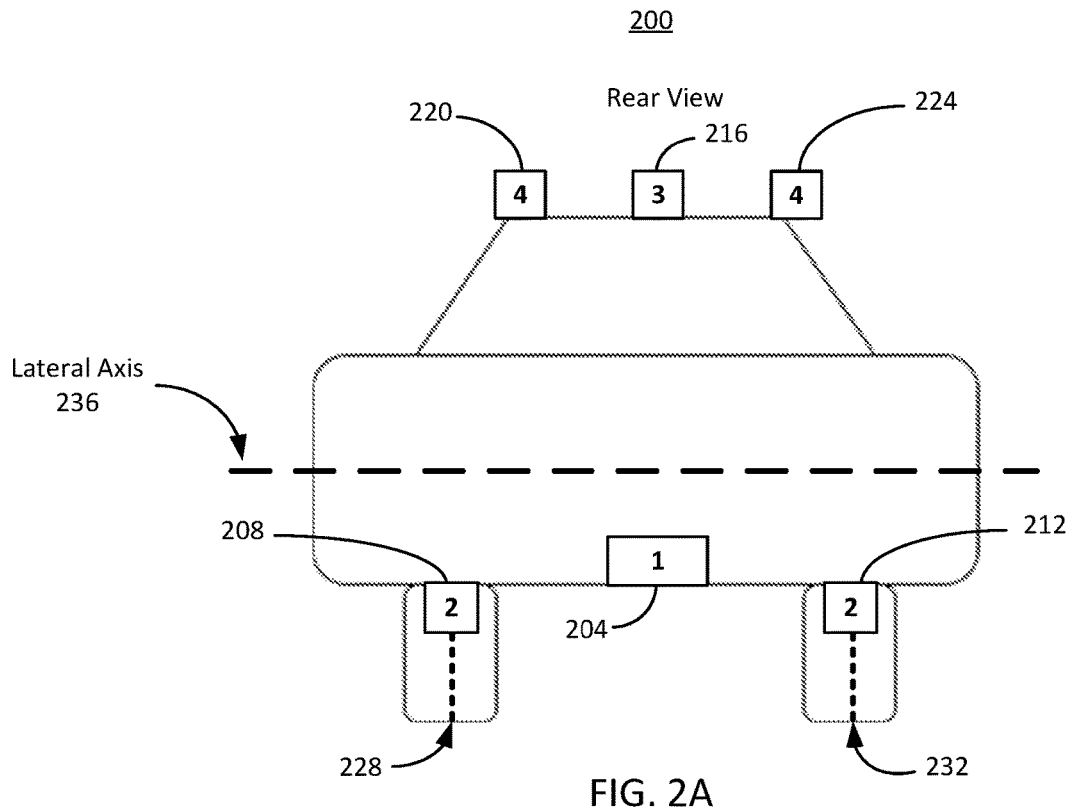
FIGS. 2A-F are example illustrations of mounting locations of sensors on a vehicle, in accordance with an implementation.

Referring now to FIG. 2A, the mounting position of each sensor can be shown. The IMU 204 can be mounted at the center of the lateral axis 236 of the vehicle 101. The IMU 204 may be located at the portion of the rear of the vehicle 101, for example. The first range sensor 208 and the second range sensor 212 can be mounted lower than the IMU 204. The first range sensor 208 can be mounted adjacent to the center tread width 228 of the left wheel of the vehicle 101. The second range sensor 212 can be mounted adjacent to the center tread width 232 of the right wheel of the vehicle 101. The positioning sensor 216 may be mounted on top of the vehicle 101 or embedded inside the vehicle 101 as a built-in sensor. The first imaging sensor 220 and the second imaging sensor 224 can be mount at the front or the distal end 244 of the vehicle 101 to detect road images in front of the vehicle 101. In some cases, an imaging sensor 116 can receive rear images of at the proximal end 248 of the vehicle 101.

Figure 2B:
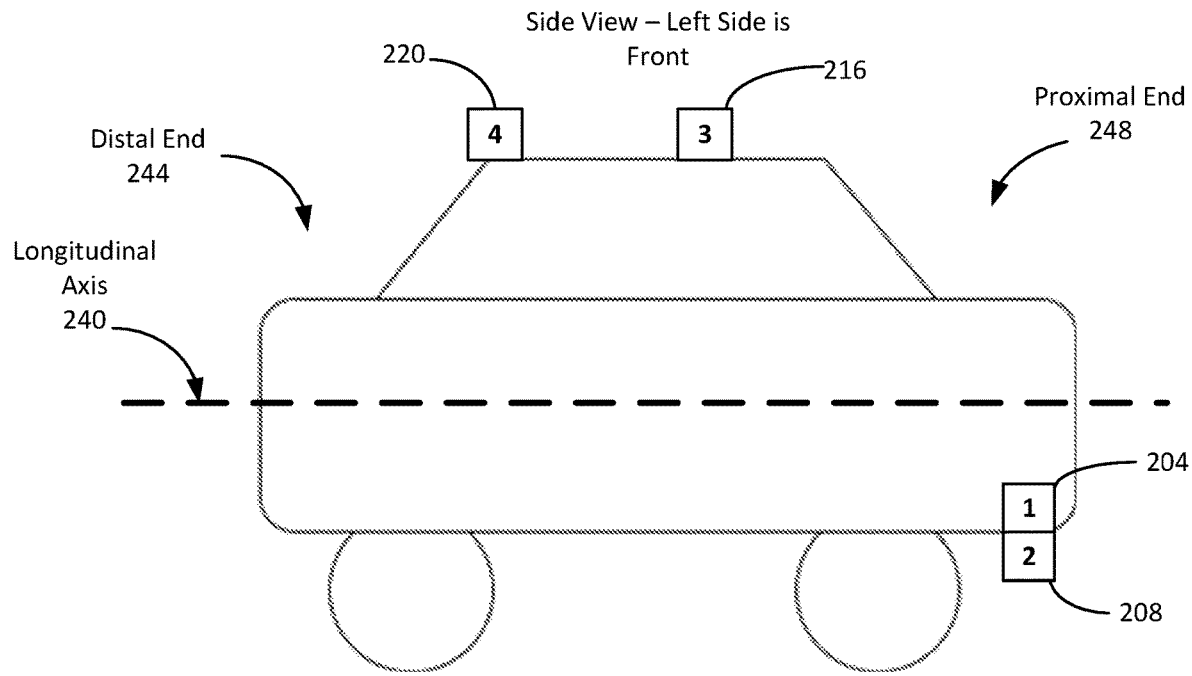
Figure 2C:
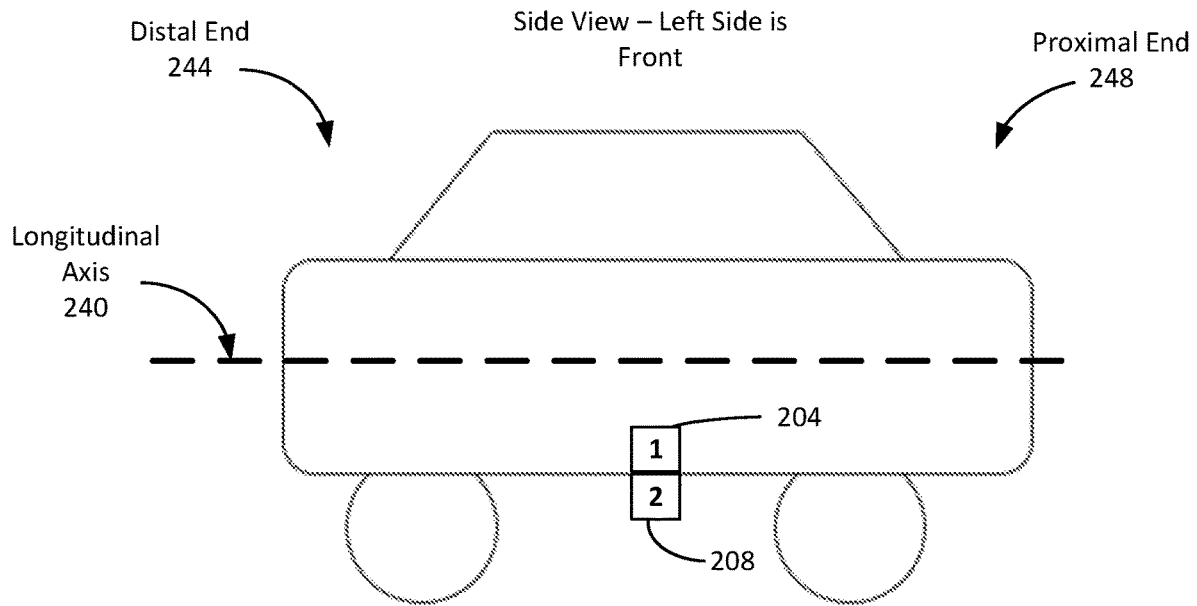
Figure 2D:
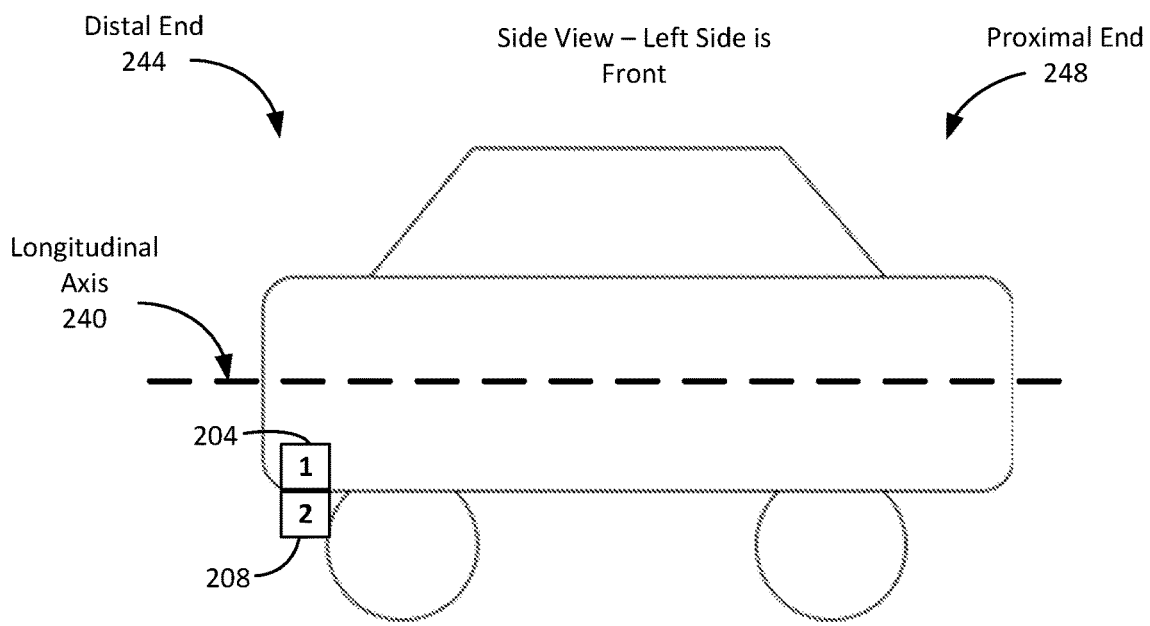

Referring now to FIG. 2B, the IMU 204 can be located at the proximal end 248 of the vehicle 101. The first range sensor 208 can be mounted lower than the IMU 204 at the same lateral axis 236 as the IMU 204. The second range sensor 212 can be mounted similar to the first range sensor 208, but on the right wheel of the vehicle 101. The mounting location of each sensor can vary. For example, and referring now to FIG. 2C, the IMU 204 may be mounted at the center of the longitudinal axis 240 of the vehicle 101. The IMU 204 can be mounted in any location along the longitudinal axis 240 of the vehicle 101 between the distal end 244 and the proximal end 248. As the IMU 204 is between the distal end 244 and the proximal end 248, the first range sensor 208 and the second range sensor 212 can be mounted at the same lateral axis 236 as the IMU 204 between the distal end 244 and the proximal end 248. Referring now to FIG. 2D, the IMU 204, the first range sensor 208, and the second range sensor 212 can be mounted at the distal end 244 of the vehicle 101. The IMU 204 and the range sensors can be mounted in the same lateral axis 236.

Figure 2E:
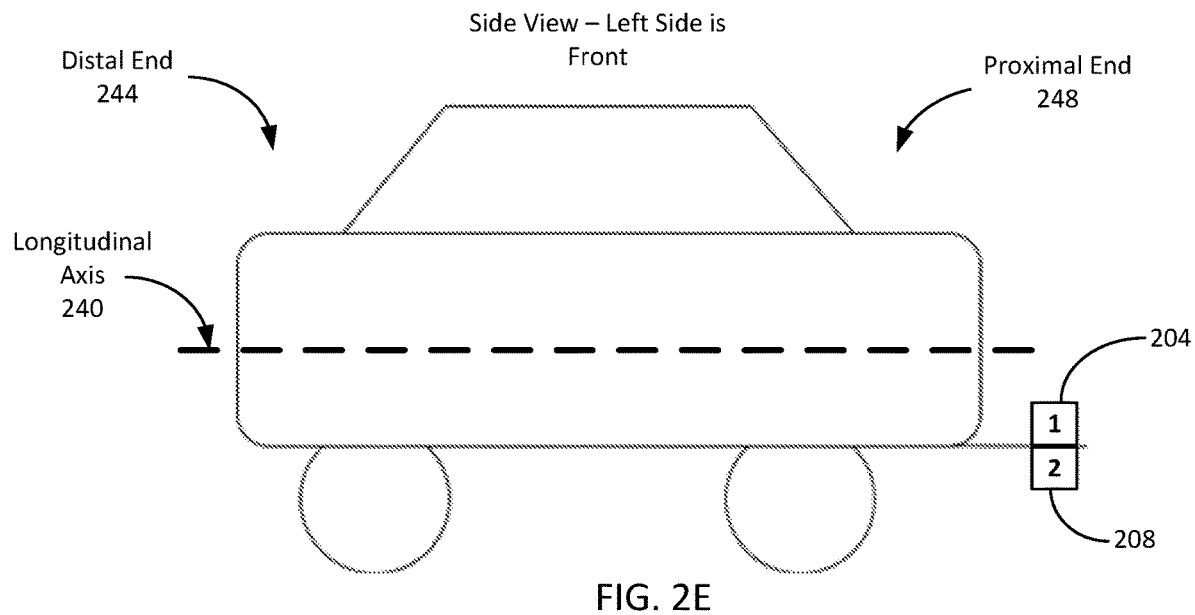
Figure 2F:
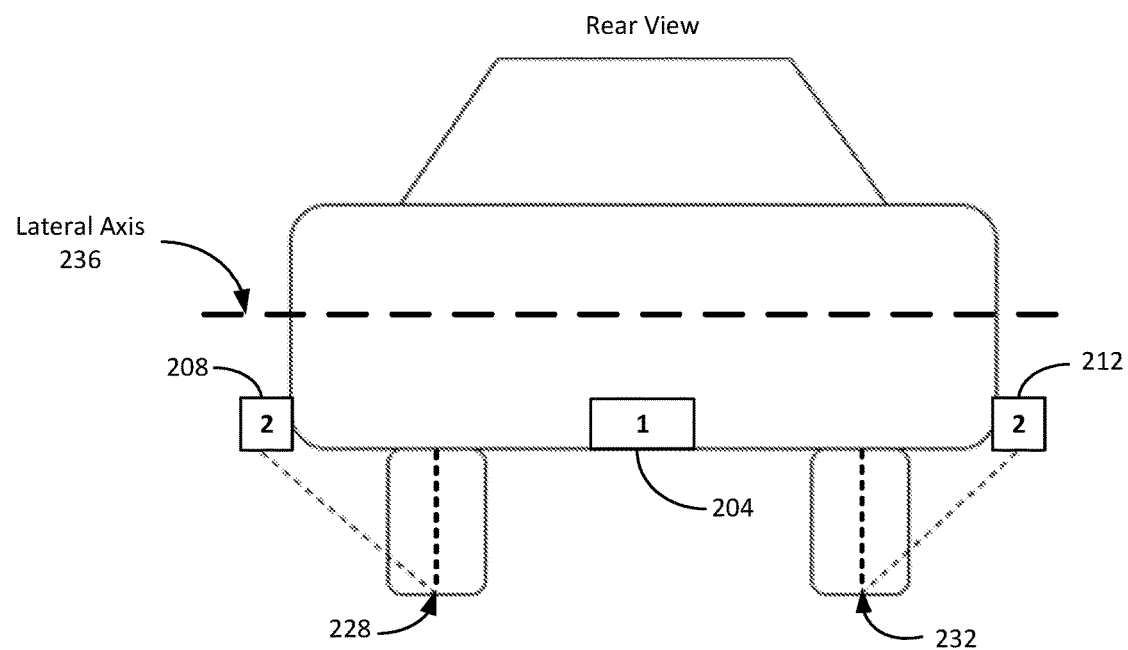

Referring now to FIG. 2E, the vehicle 101 may include an extension at the rear of the vehicle 101. the IMU 204, the first range sensor 208, and the second range sensor 212 can be mounted at the extension portion of the vehicle 101 further from the proximal end 248 of the vehicle 101. In some implementations, and referring to FIG. 2F, the first range sensor 208 and the second range sensor 212 may be mounted at the left side and the right side of the vehicle 101, respectively. The range sensors can be mounted, such as to detect or measure a distance from the range sensor to the center tread width of a wheel in contact with the ground. In this case, the first range sensor 208 can be mounted on the left side of the vehicle 101 pointing to the bottom of the center tread width 228 of the left wheel in contact with a first portion of the ground. The second range sensor 212 can be mounted on the right side of the vehicle 101 pointing to the bottom of the center tread width 232 of the right wheel in contact with a second portion of the ground.

Figure 3A:
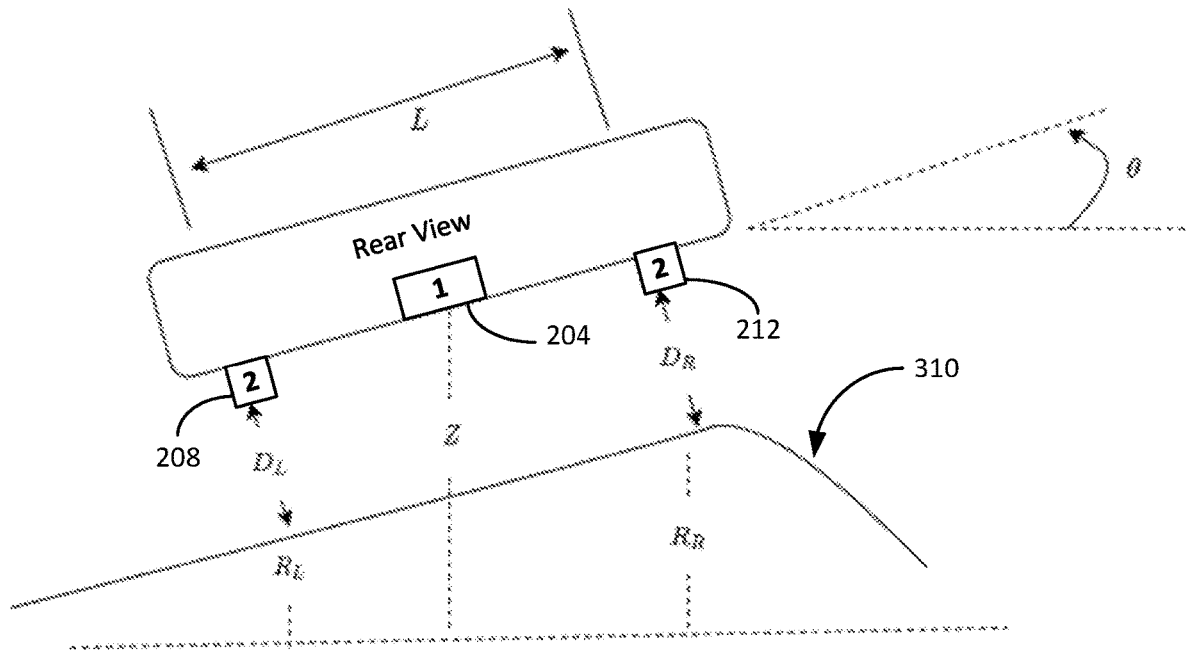
FIGS. 3A-B are example illustrations for determining vertical vehicle body height, roll angle of the vehicle, and road height, in accordance with an implementation.
Figure 3B:
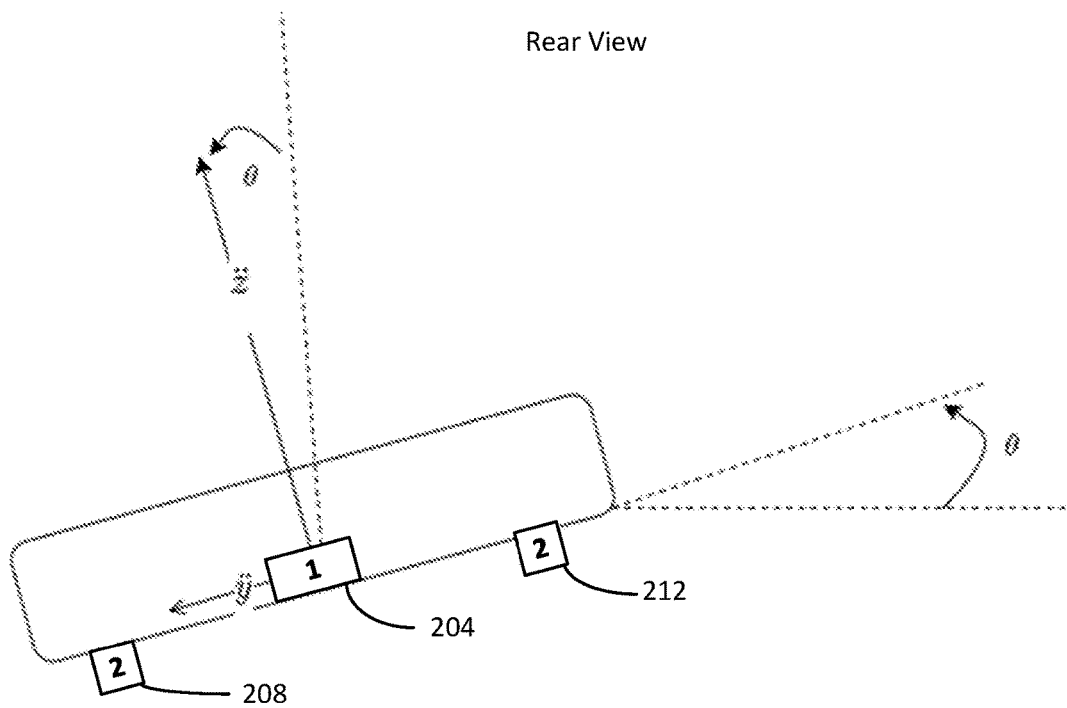

Referring to FIGS. 3A-B, example illustrations for determining vertical vehicle body height, the roll angle of the vehicle, and road height are shown, in accordance with an implementation. As in illustration 300, the body of the vehicle 101 can be shown to be over the road, for simplicity. The illustration 300 can include the IMU 204, the first range sensor 208, and the second range sensor 212. The illustration 300 can depict variables used to determine a height of the vehicle 101 from the ground (i.e., the surface under the road surface), a roll angle of the vehicle 101, and a road height. The illustration 300 can be used to facilitate details for determining the vertical displacement of the vehicle 101 from the ground, the roll angle, and the height of the road. Thus, the illustration 300 can facilitate the determination of the vertical displacement of the vehicle 101 from the ground, the roll angle, and the height of the road as described in FIG. 1.

Referring to FIG. 3A in further details, the variables determine a first height and a second height of the road are shown. A surface detection component 148 of the vehicle 101 can determine a road height based on the first height and the second height of the road. The variables can be defined as follows:

L: A vehicle track width. The vehicle track width can be based on a model, a make, or a configuration of the vehicle 101. The vehicle track width can be stored and retrieved from a vehicle configuration 164.

θ: A vehicle roll angle. The vehicle roll angle may be determined by the roll angle processing component 144. The roll angle processing component 144 can process the sensor data to derive the vehicle roll angle (i.e., the actual roll angle of the vehicle 101).

z: Vertical displacement at the location of the IMU 104. The vertical displacement at this location can be referred to as a height of the vehicle 101 from the ground (i.e., the height of the vehicle 101 to a surface below the road). The vertical displacement can be determined by the height processing component 140. This vertical displacement may be referred to as a vertical vehicle body height.

$D_L$: Left range sensor measurement. The left range sensor can be referred to as a first range sensor associated with a left wheel of the vehicle 101. The first range sensor can perform functionalities similar to the range sensor 108. The first range sensor measuring a first vertical displacement at a first side (i.e., vertical displacement at the left side) of the vehicle 101. The first side can correspond to the location of the first range sensor mounted on the vehicle 101. The mounting location can be at the center tread width of the left wheel.

$D_R$: Right range sensor measurement. The right range sensor can be referred to as a second range sensor associated with the right wheel of the vehicle 101. The second range sensor measuring a second vertical displacement at a second side (i.e., vertical displacement at the right side) of the vehicle 101. The second range sensor may perform similar features and functionalities as the first range sensor on the second side of the vehicle 101. The second side can correspond to the mounting location of the second range sensor (i.e., at the center tread width of the right wheel).

$R_L$: Left side road height (i.e., the first height of the road). The left side road height can be a vertical displacement from the surface of the ground to the surface of the road at the left side. The left side can be associated with the center thread width of the left wheel of the vehicle 101.

$R_R$: Right side road height (i.e., the second height of the road). The right side road height can be a vertical displacement from the surface of the ground to the surface of the road at the right side. The right side can be associated with the center thread width of the right wheel of the vehicle 101.

Referring to FIG. 3B in further details, the variables to determine the roll angle determined based on the sensor data are shown. The $\ddot{y}_m$ and the $\ddot{z}_m$ can indicate lowpass filtered acceleration measurements along the y axis and z axis of the vehicle 101, respectively. The θ can represent the determined roll angle based on the lateral acceleration data and the vertical acceleration data. In this case, the θ can be represented as $θ_{acc}$, different from the θ of FIG. 3A. Therefore, FIGS. 3A-B and the corresponding variables can provide an example illustration for determining a first height and a second height of the road, based on the vertical vehicle body height and the roll angle.

Figure 4:
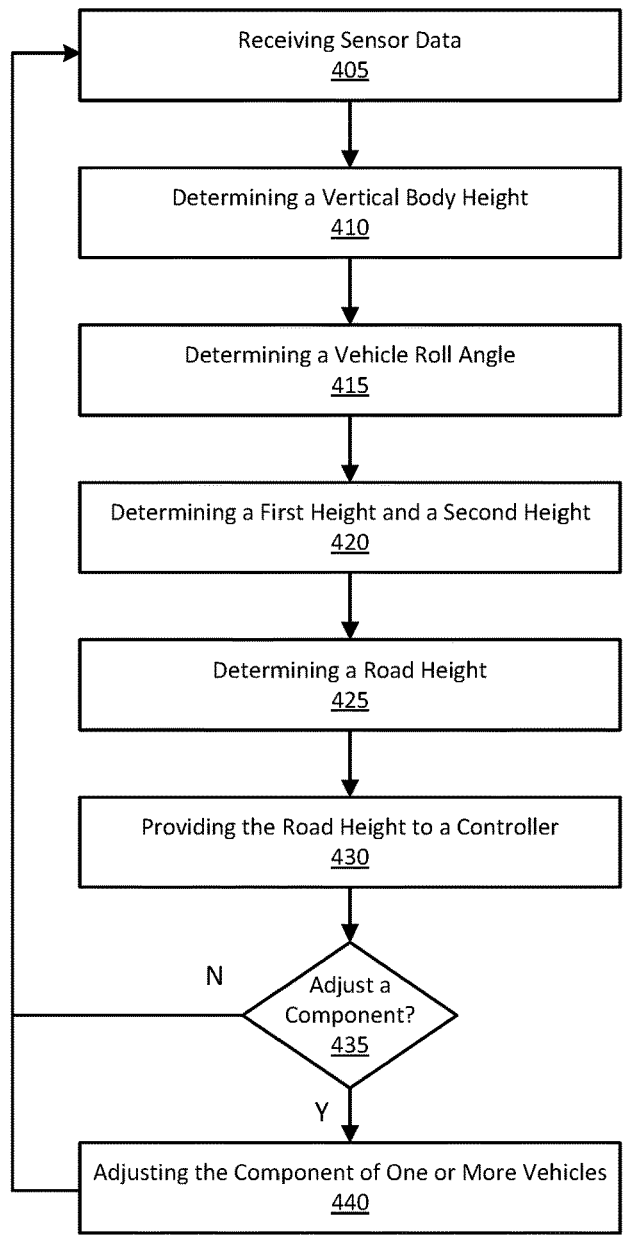
FIG. 4 is a flow diagram of an example method of controlling components of a vehicle, in accordance with an implementation.

Referring to FIG. 4, a flow diagram of an example method of controlling components of a vehicle is shown, in accordance with an implementation. The method 400 can be performed by system 100 or one or more components thereof. In brief overview, at step 405, the DPS can receive sensor data from sensors of the system 100. At step 410, the DPS can determine a vehicle body height. At step 415, the DPS can determine a vehicle roll angle. At step 420, the DPS can determine a first height of a road and a second height or the road. At step 425, the DPS can determine a road height based on the first height of the road and the second height of the road. At step 430, the DPS can provide the road height to a controller of one or more vehicles. At step 435, the DPS can determine whether to adjust or control at least one component of the one or more vehicles. At step 440, based on a determination to adjust the at least one component, the DPS can adjust the component of the one or more vehicles.

Referring to FIG. 4 in further details, the DPS can receive sensor data from sensors of the system 100. The sensors can include an IMU, at least one range sensor, a positioning sensor, and at least one imaging sensor. The DPS can receive sensor data corresponding to each of the sensors. The DPS can receive, via the IMU on a vehicle that measures at a frequency of at least 100 Hz, vertical acceleration data, angular velocity data, and lateral acceleration data. The vehicle receiving the sensor data can be referred to as a first vehicle. Each of the acceleration data can be converted to velocity data, such as vertical velocity data and lateral velocity data. Each of the velocity data can be converted to acceleration data, such as angular velocity data, the converted vertical velocity data, and the converted lateral velocity data. In some cases, the IMU can measure directly measure the velocity data and the acceleration data. The IMU can be mounted in positions similar to sensor 204.

The DPS of the vehicle can receive, via a first range sensor on the vehicle first vertical displacement data corresponding to a distance between the first range sensor and a first portion of ground that contacts a first tire of the vehicle. The first range sensor can measure at the same frequency as the IMU, such as at least 100 Hz. The first range sensor can be mounted at a lateral axis of the vehicle with the IMU. The mounting locations of the first range sensor can correspond to sensor 208 of at least FIG. 2A, for example. The DPS can receive, via a second range sensor on the vehicle, second vertical displacement data corresponding to a distance between the second range sensor and a second portion of the ground that contacts a second tire of the vehicle. The second range sensor can operate at the frequency similar to the IMU. The first vertical displacement and the second vertical displacement can be referred to and or shown in at least FIG. 3A (e.g., $D_L$ and $D_R$, respectively). The second range sensor can be located on the lateral axis of the vehicle with the IMU. The mounting location of the second range sensor can correspond to sensor 212 of at least FIG. 2A, for example.

The DPS can receive, via a positioning sensor on the vehicle, location data of the vehicle and altitude data of the vehicle. The positioning sensor can receive one or more signals from one or more satellites to determine the location of the vehicle. The location information can be sent, from the positioning sensor, as location data to the DPS. For example, the positioning sensor can receive signals from multiple satellites. Each signal can include a transmission timestamp of the signal and location information of the satellite with respect to the positioning sensor. By taking the difference between the transmission timestamp and a time the positioning sensor receives the signal, the positioning sensor can determine its position in at least three dimensions, such as north, east, and altitude (i.e., x-axis, y-axis, and z-axis). By receiving multiple sources of signals from multiple satellites, the positioning sensor can determine the location of the vehicle with higher localization.

In some implementations, the positioning sensor can be a differential GPS or an RTK GPS. The DPS can transmit an initial location data to a base station. The base station can be the one closest to the positioning sensor. The base station can receive the location data from the DPS, and receive signals from the satellites to determine the location of the base station. Based on a comparison between the actual location of the base station and the location determined by the reception of signals from the satellites, the base station can correct drift, bias, or deviation of the location data. The base station can transmit a second location data to the DPS, such that the DPS can utilize the second location data to indicate the location of the vehicle. The DPS can receive the sensor data from the sensors in any order, such as from i) the imaging sensor, ii) the imaging sensor, iii) the positioning sensor, and then iv) the IMU.

At step 410, the DPS can determine a vertical vehicle body height based on fusing the vertical acceleration data and the altitude data. The vertical vehicle body height can refer to a distance between the body of the vehicle and the ground. Specifically, and as an example, the body of the vehicle for determining the vertical vehicle body height can refer to the center of the lateral axis of an undercarriage of the vehicle. In this case, the ground can be the surface of the earth below the surface of the road. The portion of the ground for determining the vertical vehicle body height can be vertical from the body of the vehicle. The vertical acceleration data can be measured from the IMU. The altitude data can be measured from the positioning sensor. In some cases, the acceleration data used to determine the road height can be interchanged with velocity data, or vice versa.

The fusing of the vertical acceleration data and the altitude data can include an application of a model (e.g., state-space model) and a filtering technique (e.g., Kalman filter). Additionally, the fusing of data can include additional data measured by built-in sensors of vehicle or bias data introduced from the sensor data. For example, to determine the vertical vehicle body height (i.e., the height of the body of the vehicle), the DPS can generate a model including actual vertical vehicle body velocity data, sensor bias data, the vertical velocity data having the sensor bias, first random noise data to model the changing rate of the sensor bias, second random noise to model the measurement noise on the altitude data from the positioning sensor, and the altitude data. The actual vertical vehicle body velocity data can refer to vertical velocity data measured by a built-in sensor of the vehicle. The vertical velocity can be derived from the vertical acceleration data, where the sensor may include bias or noise into the data. The sensor bias can vary slowly due to environmental conditions, such as gravity, temperature, and so forth. The vertical vehicle body height can be determined by the height processing component.

In further example, the aforementioned data can be used to generate the model for determining the vertical vehicle body height. The model can be described in further details in FIG. 1. Once the model is generated, the DPS can insert the model into the filter to remove noise or other biases in the data. In some implementations, the sensor data may be processed by a server instead of the DPS, such as to determine the vertical vehicle body height, a roll angle of the vehicle, and a road height at the location of the vehicle. For example, the DPS may transmit the sensor data to the server via a network. The server can include similar components or processing units as the DPS to process the sensor data. Thus, subsequent to the transmission, the server can determine the road height at the location of the vehicle and generate the road profile based on at least the road height. Furthermore, the road height can be fused with sensor data from the built-in vehicle sensor, such as wheel rotation speed or rate, to determine road grade data and road friction data at the location or within a proximity of the location of the vehicle. Additionally, the server can transmit the road height data or the road profile to one or more vehicles in addition to the vehicle.

At step 415, the DPS can determine a vehicle roll angle based on fusing the vertical acceleration data, the angular velocity data, and the lateral acceleration data. The vehicle roll angle can indicate a tilt in the vehicle body or a degree of which the vehicle body deviates from a leveled surface. The vehicle roll angle can be based on the curvature and inclination of the road. The vehicle roll angle can be determined by the roll angle processing component. The determination can be described in further details in FIG. 1.

The fusing of the sensor data can be similar to the above for determining the vertical vehicle body height. Additionally, the sensors of the system 100 can determine velocity data corresponding to the acceleration data. In some cases, the DPS can convert between acceleration data and velocity data. For example, the roll angle (i.e., actual roll angle or a second roll angle) of the vehicle can be determined by generating a model (i.e., a second model) and applying a filter similar to the model (e.g., a first model). The model can be generated based on the following information: i) an initial roll angle (i.e., measured roll angle, estimated roll angle, first roll angle) based on gravity components on the y-axis and the z-axis direction (e.g., see FIG. 3B); ii) sensor bias data; iii) angular velocity measured by the IMU; iv) random noise to model the changing rate in the sensor bias data due to gravity or other environmental condition, for example; and v) random noise to model a difference between the actual roll angle and the initial roll angle. Once generated, the model can be inserted into the filter to remove biases or noise in the data. Thus, the roll angle of the vehicle can be determined by the DPS or the server.

At step 420, the DPS can determine a first height of a first side of the vehicle and a second height of a second side of the vehicle. The determination of the first height and the second height of the road can be based on a track width of the vehicle, the first vertical displacement data, the second vertical displacement data, the vertical vehicle body height, and the vehicle roll angle. The surface detection component can process the data to determine the first height and the second height. In this case, each side of the vehicle can correspond to the center tread width of a wheel associated with the side. For example, the first side of the vehicle can correspond to the center tread width of the left wheel and the second side of the vehicle can correspond to the center tread width of the right wheel. An example illustration to facilitate these details can be seen in at least FIG. 2F. The first height and the second height can be determined based on the aforementioned sensor data received from the sensors of the vehicle and data determined by at least the height processing component and the roll angle processing component.

For example, the surface detection component can determine the first height and the second height based on i) vehicle track width data; ii) the vehicle roll angle determined by the roll angle processing component; iii) the vertical displacement from the IMU location (i.e., vertical vehicle body height); iv) the first vertical displacement data from the first range sensor; v) the second vertical displacement data from the second range sensor; vi) the first height of the road at the first side; and vii) the second height of the road at the second side. The vehicle track width can be based on the model, the make, and the configuration of the vehicle. The track width information can be retrieved from vehicle configuration. Utilizing these data and information, the surface detection component can determine the road height via a technique as described in FIG. 1.

The first height and the second height can indicate an inclination of the road. For example, with first height corresponding to a left side of the vehicle and the second height corresponding to the right side of the vehicle, the difference between the first height and the second height can indicate the slope or inclination level. If the first height is lower than the second height (i.e., the second height is higher than the first height), the DPS or the server can determine a left downward slope at an angle similar to the roll angle. If the opposite (i.e., the second height is lower than the first height), the DPS or the server can determine an upward slope at the angle similar to the roll angle. The road can be referred to as a camber or an area between a shoulder (i.e., curb) and a crown (i.e., the center of a bi-directional road, separating the traffic direction). In some cases, if the road is a one-way or a single carriageway, the road can correspond to a camber between two shoulders.

At step 425, the DPS can determine a road height at the location on the ground based on the first height of the first side of the vehicle and the second height of the second side of the vehicle. The road height may be determined by the server based on data from the DPS. For example, the server can receive sensor data, the vertical vehicle body height data, and the roll angle data from the DPS. The server may include a remote DPS including components and features similar to the DPS of the vehicle. The road height can be referred to as an elevated surface from the ground (i.e., the surface of the earth). The road height can include inclination or slope, which can be referred to as road grade. In some cases, the road height, including sensor data from the sensors, can indicate friction data, texture data, roughness level, or condition of the road. The road height can be used by one or more vehicles to control their respective vehicle systems. The vehicle can determine the road height using the surface detection component. In some cases, the first height and the second height can be processed by the server. The server can determine the road height based on at least the first height and the second height at the location of the vehicle. The server can transmit the road height to one or more vehicles including the vehicle that detects information for determining the road height.

In some implementations, the server can select one or more vehicles for transmitting the road height. The selection of one or more vehicles can be based on the location of the road height. For example, the server can identify one or more vehicles approaching the location of the road height. Based on the identification, the server can select the one or more vehicles and transmit the road height to the one or more vehicles. The vehicles approaching the location can refer to vehicles within a radius or an area of the location and traveling towards the location of the road height. In another example, the server can select the one or more vehicles based on a geographical location of the vehicles, such as a zip code corresponding to the location of each of the one or more vehicles.

At step 430, the DPS can provide the road height to a controller 156 of one or more vehicles. The one or more vehicles can be the vehicle at the location of the road height. In some cases, the DPS of the one or more vehicles can receive the road height from the server via the network. For example, the DPS of the one or more vehicles can receive the road height from the server, or determine the road height offline via the surface detection component of the DPS corresponding to one or the one or more vehicles. By providing the road height to the controller, the DPS of the vehicle can cause the controller to control a component of the vehicle based on the road height. The DPS can cause the controller to provide instructions to at least one vehicle system to control at least one component of the vehicle. The road height can include a slope of the road in the lateral axis of the vehicle. For example, the controller of the vehicle can receive the road height. Subsequent to receiving the road height and based on the vehicle approaching the location at the road height, the controller can control at least the steering system to assist with steering, the braking system to assist with braking, or the suspension system to assist with dampening impact.

At step 435, the DPS can determine whether to adjust a component of the one or more vehicles. Adjusting the component can refer to controlling the component of a vehicle. The determination can be responsive to the controller receiving the road height, for example, from the server or from the surface detection component of the DPS. The DPS can determine to adjust at least one component of the system based on at least the control program stored in the data repository. The control program can include one or more associations between the road height (i.e., condition for controlling the vehicle systems) and instructions to provide to at least one of the vehicle systems (i.e., the vehicle system to control and parameter to adjust). For example, the control program can indicate a threshold angle to initiate an instruction for controlling the steering system of the vehicle or corresponding to one or more vehicles. The threshold angle can be predetermined, such as based on vehicle configuration data (e.g., the roll angle that can affect the steering of the vehicle).

The control program from the data repository can include a hash table. The hash table can include an association between one or more instructions to control a component of the vehicle and a response from the vehicle at the location of the road height. The response can refer to an effect applied to the vehicle. For example, the response from the road height can include an effect to the steering of the vehicle (e.g., the road height can cause the vehicle turn towards a downward direction of the road slope), effect to the friction level between one or more wheels of the vehicle and the road, or effect to the suspension system caused by a sudden dip in the road height from a first location road height to a second location road height. The controller can identify the response from the vehicle at the location of the road height based on at least vehicle configuration information, one or more locations around the location of the road height, or imaging data.

For example, based on the vehicle configuration data, the controller can determine that the steering of the vehicle will be affected by the road height. In further example, based on the one or more locations around the location of the road height, the controller can determine that the road height can cause a sudden dip (e.g., pothole or manhole) to the vehicle. The one or more locations can refer to a first location prior to the location of the road height, or a second location after the location of the road height. The first location and the second location having a first road height and a second road height, different from the road height determined at the location. In another example, based on imaging data, the controller can determine that the location of the road consists of a turn, such that the road height (e.g., slope and inclination) can support the vehicle at the turn. In these examples, the controller can provide instructions according to the effect the road height can cause for the vehicle.

In some implementations, the road height can indicate a flat road. The controller can determine that the flat road may not affect the friction, the steering, or the suspension of the vehicle. In this case, the controller can determine to not adjust the component of the one or more vehicles. As such, the method 400 can further receive sensor data at step 405, such as to determine one or more road heights at other locations on the road.

At step 440, the DPS can adjust the component of the one or more vehicles based on a determination to adjust the component. The component of each of the one or more vehicles can include at least a brake system, a suspension system, and a steering system. The DPS can adjust the component using the controller. The controller can adjust the brake level or brake coefficient of the brake system. The controller can adjust the dampening level for a semi-active suspension or height level of an active suspension of the suspension system. The controller can adjust the steering system, such as by providing additional feedback to assist with turning the vehicle or to maintain the steering position of the vehicle. The controller can control the component of one or more vehicles based on the road height. The road height can include an inclination or a slope. For example, the controller can control the steering system to steer the vehicle based on an inclination of the road. The inclination can be referred to as a slope in the lateral axis. The road may include inclination for drainage purposes (e.g., an indication of a straight road path) or to assist vehicles with turning at a high speed, such as on an exit of a highway (e.g., an indication of a turn). The determination of each case can be based on imaging data, for example. The controller can assist steering the vehicle with the turn or retain the steering wheel if the path is straight.

In some implementations, the inclination can be in the longitudinal axis. This includes the one or more vehicles traveling uphill or downhill. The controller can control at least one vehicle system based on this inclination. For example, the controller can control the braking system of the vehicle. If the vehicle travels on an upward slope, increasing friction between the wheels and the road, the controller can decrease the braking level (i.e., braking coefficient). By lowering the braking level, fuel efficiency can improve. For example, in case of an upward slope, if the operator of the vehicle applies pressure to the brake pedal equal to the pressure applied when the operator travels on a flat road, the vehicle may be stopped at a shorter distance (i.e., stopped abruptly) on the upward road than a stopping distance on the flat road. Instead, by lowering the braking level, the operator can apply similar pressure to the brake pedal of the vehicle to stop the vehicle at a similar distance when traveling on a flat road. On the other hand, if the vehicle travels on a downward slope or road, the friction between the wheels and the road can decrease. In this case, the controller can increase the brake level, such that the operator can apply less force to the brake pedal to stop the vehicle. Increasing the brake level can improve the safety of the operator on the vehicle. If the brake level is too high, the operator may experience an uncomfortable or unsteady riding experience, whereas if the brake level is too low, the safety of the operator may be compromised. Thus, the systems, methods, and apparatus can provide a balance between a high and low brake level to improve the safety and traveling experience for the operator.

In some implementations, the DPS or the server can determine multiple locations around the location of the road height. The location of the road height can be referred as, for example, a first location having a first road height. For example, the DPS or the server can determine a second location having a second road height prior to the first location, and a third location having a third road height after the first location. In further example, the first road height can be determined to have an inclination of above 30 degrees. The second road height and the third road height can indicate a flat surface. The distance between the first location from the second location, and the first location to the third location, may be less than one meter, for example. In this case, the DPS or the server can determine, based on the angle difference between the first road height, the second road height, and the third road height, that the first road height includes an obstruction, such as a pothole or a bump. The controller can provide instructions to the suspension system of the vehicle to dampen the impact of the obstruction. For example, based on the suspension system of the vehicle, the controller can adjust the dampening level of the semi-active suspension system or adjust the height of the active suspension system.

In further example, the DPS can receive image data to provide a preview of a second road height at a second location. The second road height can include an indication of an obstruction. Prior to the impact, the controller can adjust one or more vehicle systems to mitigate the obstruction. For example, the suspension system can control the suspension of the vehicle based on the image data and sensor data built-in to the vehicle (e.g., vehicle velocity to determine a time of impact). Thus, the controller of the vehicle can adjust the suspension prior to the time of impact. The suspension of the vehicle may be a suspension of one or other vehicles which receives the road height data from the server. The sensor data can be processed in real-time by the DPS and sent to the server for distribution with one or more vehicles. In further example, the DPS can transmit collected sensor data to the server for processing. The server can perform similar features and functionalities as one or more components of the DPS. Subsequent to adjusting the vehicle system of at least one of the one or more vehicles, the DPS and the server can reiterate the process, such as transitioning back to step 405 of method 400.

Figure 5:
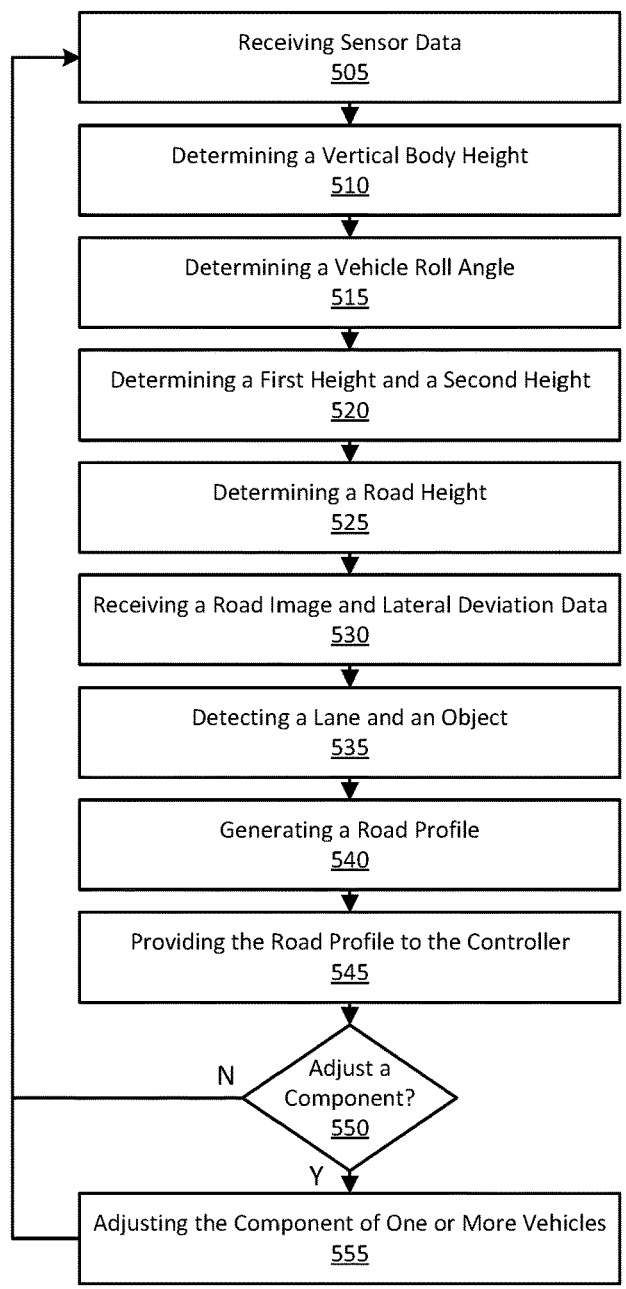
FIG. 5 is a flow diagram of an example method of controlling components of a vehicle based on a road profile, in accordance with an implementation.

Referring to FIG. 5, a flow diagram of an example method of controlling components of a vehicle based on a road profile is shown, in accordance with an implementation. The method 500 can be performed by system 100 or one or more components thereof. In brief overview, at step 505, the DPS can receive sensor data from sensors of the vehicle. At step 510, the DPS can determine a vehicle body height. At step 515, the DPS can determine a vehicle roll angle. At step 520, the DPS can determine a first height of a road and a second height or the road. At step 525, the DPS can determine a road height based on the first height of the road and the second height of the road. Steps 505-525 can be performed similar to steps 405-425 of method 400. At step 530, the DPS can receive a road image and lateral deviation data of the vehicle. At step 535, the DPS can detect a lane and an object on the road. At step 540, the DPS can generate a road profile based on the collected and processed information. At step 545, the DPS can provide the road profile to the controller corresponding to one or more vehicles. At step 550, the DPS can determine whether to adjust at least one component of a vehicle of the one or more vehicles, similar to step 435 of method 400. At step 555, the DPS can adjust at least one component of the vehicle.

Referring to FIG. 5 in further details, the DPS can receive a road image and lateral deviation data of the vehicle, at step 530. The road image and the lateral deviation can be measured or detected via the imaging sensor. The road image and the lateral deviation data can be processed by the surface detection component of the DPS. The road image can include a snapshot of the road by the imaging sensor of the vehicle. The DPS can receive multiple road images detect by multiple imaging sensors, such as sensor 208 and sensor 212. The road image data can include a timestamp at which the imaging sensor detects the road image at the location of the vehicle. The image data can provide the DPS with previews of the road. The previews can indicate a turn or a straight path of the road. The lateral deviation data indicate a distance the vehicle deviates from the center of the lane. The lateral deviation data can facilitate the localization of the location of the vehicle.

In some implementations, the sensor data can be processed by the server. The server can generate a road profile of the road traveled on by the vehicle collecting the sensor data. Once generated, the server can distribute the road profile with one or more vehicles. The one or more vehicles can be selected by the server based on locations of the one or more vehicles. The server can include components similar to the DPS, such that the server can perform similar features and functionalities as the DPS. In some cases, DPS between the one or more vehicles may include slight variations to the features and data processing capabilities. In such cases, the server may collect data across multiple vehicles at a location on the road and perform a data comparison. The server may discard data deemed to be inaccurate.

For example, the server can receive data from five different vehicles. Four out of the five vehicles can provide sensor data indicating that the road height is 10 inches. The fifth vehicle may provide sensor data indicating a road height of 15 inches. The server may store the road height indicated by sensor data from a majority of the vehicles (i.e., store the 10 inches) and discard the sensor data and the road height from the fifth vehicle. In some cases, data may not be discarded, but stored for further analysis or as a reference. In some cases, a road survey from road construction may determine that the actual road height is 15 inches, similar to the sensor data from the fifth vehicle. In this case, the server can update the road height stored in the remote data repository. Furthermore, the fifth vehicle may be marked as having higher priority or ranking of data accuracy than the other four vehicles providing accurate sensor data for determining a road height. In some cases, the four vehicles may be marked as having low priority or ranking.

In further example, the server may conclude that, based on the majority of the vehicles (e.g., including additional vehicles other than the five), the road height is 10 inches. The fifth vehicle may be marked with a low ranking of accuracy. The four out of the five vehicles may be marked with a high ranking of accuracy. The ranking can determine a priority in data processing. For example, the server may limit the amount of sensor data to process by selecting sensor data from one or more vehicles with high rankings. Thus, the server can process sensor data from vehicles marked with high rank prior to those with low rank to reduce resource consumption and processing time. In some cases, the server can discard or disregard sensor data from vehicles marked with the low ranking, such as to remove inaccurate data from the equation. In some other cases, multiple sensor data from different vehicles (i.e., such as those marked as high rank) can be combined to approximate the road height. The aforementioned process may be applied to other data determination or generation, such as the road profile, lane detection, road grade, or road friction data.

At step 535, the DPS can detect a lane and an object on the road. The DPS can detect the lane and the object via the surface detection component processing the road image and the lateral deviation data. The surface detection component can include lane detection and obstruction detection features. The lane detection can detect which of the multi-lane road the vehicle is traveling on or switched to. The lane detection can detect one or more lanes of opposing traffic. The obstruction detected can include different types and severity. The types can include pothole, bumps, cracks, or other objects on the road. The severity can indicate a size, a level, or relevancy of the obstruction towards the safety and health of one or more vehicles. For example, the obstruction detection feature can include three level of severity, such as low, medium, and high. A low level can include cracks, manhole, or road construction, which may not pose an effect on the riding experience of the one or more vehicles. A high level can include large potholes, which may not be avoidable. The high level can refer to obstructions which can damage the one or more vehicles or impact operator experience on the road. The medium level can refer to obstructions which may or may not impact the one or more vehicles, such as a pothole in the center of a lane, which can be avoided by steering away from the center of the lane or driving past the obstruction.

At step 540, the DPS can generate a road profile based on the collected and processed sensor data and vehicle configuration data. The road profile can include the road height, road grade data, and road friction data. The road profile can include data received from the sensors including the built-in sensors of the vehicle. The road profile data can be used by the controller of one or more vehicles to determine an instruction or a control program to command at least one of the vehicle systems corresponding to each vehicle. The DPS can generate the road profile using the road profile generator of the DPS. The road profile can be stored in a data repository of the vehicle. In some cases, the DPS can transmit the road profile to the server for storage in the remote data repository. The road profile can include an indication of one or more obstructions having a severity level. The severity level can indicate a threat level of the obstruction towards the safety and road experience of the operator. As an example, there can be three thread levels including low, medium, and high. The low level can indicate that there is an obstruction on or near the road. The obstruction on the low level will not compromise the safety of the operator nor affect the longevity of the vehicle. A high level can indicate that obstruction will compromise the safety of the operator and affect the longevity of the vehicle. A medium level can indicate that an obstruction may pose a threat on the safety of the operator and may damage the vehicle. In further example, if the obstruction refers to a pothole, a medium severity can refer to a pothole that is avoidable by one or more vehicles. However, the pothole can grow in size, potentially being unavoidable at a later time.

The location of the obstruction can be determined by the processing image data from the imaging sensor. The image data can be processed by the surface detection component. The image data can detect a lane used by the vehicle. The image data can indicate an animated object and provide labels in the image data as to a type of object. Types of an object can include road signs, road construction, pedestrians, potholes, curbs, or other obstructions or mark on the road.

In some implementations, the server can generate a road profile based on sensor data or other information from the vehicle. The server can perform functions and features similar to the DPS to generate the road profile. The server can generate the road profile based on road height processed either by the server or the DPS of one or more vehicles. The generated road profile can be managed by a road profile manager and stored in a remote data repository. The road profile manager can distribute the road profile, compare received road profiles (i.e., or sensor data) from multiple vehicles, select road profile to store or discard, or convert road profile to different formats. The different formats can include 2D vertical road image, 3D illustration of the road, text data, binary data, or other format for processing by the one or more vehicles.

At step 545, the DPS can provide the road profile to the controller 156 of one or more vehicles. The road profile can be from the server or processed by the DPS of the vehicle. The step of providing the road profile to the controller 156 can be similar to providing the road height to the controller ads in step 430 of method 400. For example, by providing the road profile to the controller of the vehicle, the DPS of the vehicle can cause the controller to control a component of the vehicle based on the road profile. The road profile can include at least the road height, the road grade, and the road friction. The DPS can cause the controller to provide instructions to at least one vehicle system to control at least one component of the vehicle.

The road height can include a thickness or a height of the road with respect to the ground. The height of the road can indicate a temperature of the road associated with the environmental condition, such as humidity, temperature, or other weather condition in a geographical location. Having a thicker road (i.e., pavement) can increase the distribution of heat. For example, if the environmental condition indicates a temperature of 70 degrees Fahrenheit, a thinner road can result in a higher temperature of 90 degrees Fahrenheit, and a thicker road can result in a temperature of close to 70 degrees Fahrenheit due to distribution of heat on the road. The temperature of the pavement can affect road friction and may damage the tire. For example, tires of a vehicle can be constructed with materials, such as rubber. High-temperature pavement can soften or melt the rubber of the tire. Due to the softening of the material, the surface area of the tire in contact with the road can increase. Increasing the surface area between the tire and the road can increase the friction level. As such, the controller of the vehicle can determine to reduce the brake level or braking coefficient due to the high temperature of the pavement. In further example, by maintaining a high brake level, materials can be scrapped or shaved off the tires during the braking process.

Additionally, the road height can indicate a slope of the road. The slope can refer to an angle introduced by the road, associated with the roll angle of the vehicle. The road grade can be derived from the road height with respect to a distance on the road. The distance can be determined based on image data processed by the surface detection component. The road grade can include curvature of the road. For example, the controller of the vehicle can receive the road profile from the road profile generator of the DPS or the server. Subsequent to receiving the road profile including the road grade indicating the road curvature, the controller can determine that the vehicle would need to be steered to remain in the lane. Accordingly, the controller can access control program having one or more instructions to provide to at least the steering system of the vehicle.

The controller can determine to transmit instructions to control the braking system and the suspension system based on the road grade. For example, if the road grade indicates a left curvature, the vehicle can turn left along the curvature to remain in a lane. To assist the vehicle with the turn along the curvature, the suspension of the wheels on the left side of the vehicle can be lowered, the suspension of the wheels on the right side of the vehicle can be heightened, or both. In further example, if an inclination is introduced along the curvature of the road, the controller can determine to adjust the braking coefficient of the vehicle to accommodate for changes in friction between the wheels and the road.

At step 550, the DPS can determine whether to adjust at least one component of one or more vehicles, similar to step 435 of method 400. The determination to adjust the component of one or more vehicles can be based on the road profile data. The road profile data can include the road height, the road grade, and the road friction data. The controller of the DPS can determine whether to adjust the component and the type of adjustment for the component. The controller can determine whether to adjust at least one component based on the road height of the road profile similar to step 440 of the method 400.

The controller can determine to adjust at least one component based on the road grade data. The road grade data referring to the curvature of the road. The controller can utilize the image data processed by the surface detection component (i.e., of the DPS or the server) to determine whether to adjust the at least one component of the vehicle. The image data can provide a previous of the road. The image data can be a vertical model or a horizontal model of the road, such as a 2D model or a 3D model. Furthermore, the processed sensor data, or any other data to facilitate this determination and to control the component can be from one or more vehicles. For example, the DPS can receive the road profile having sensor data from other vehicles to determine whether to adjust the component of the vehicle. The controller can perform the determination based on a vehicle configuration specific to the vehicle. The road profile can introduce different characteristics and effects towards one or more vehicles with different configurations. For example, the road angle of 20 degrees may not affect the trajectory of a sedan, while the same road angle may affect the steering of a truck. This may be due to a weight, a track width, a vertical vehicle body height, or other vehicle configuration of each vehicle.

The controller can determine to adjust at least one of the components of the vehicle based on the road grade and one or more preview information from the image data. For example, the road grade can indicate a curvature on the road. The curvature can indicate multiple road heights throughout a distance of the road. The road grade can be determined by aggregating road height data from a first location to a second location. The first location and the second location can be a distance apart, such as 100 meters, 150 meters, etc. In further example, the DPS can collect sensor data for aggregation of the road heights. The DPS can transmit the sensor data to the server for processing. Once processed, the server can determine the road grade to provide to one or more vehicles. The controller of each vehicle of the one or more vehicles can determine whether to adjust at least one component if the road grade affects the at least one component of the vehicle, such as the steering, the friction level, and the suspension of the vehicle.

The control program may be specific to the vehicle configuration of the vehicle. Different configurations of one or more vehicles may use different control programs. The vehicle configuration can be altered, such as by car manufacturer or certified auto services. The alteration may be recorded, and the vehicle configuration can be updated in the data repository of the vehicle. In some cases, the vehicle configuration may be altered due to damages to the vehicle. For example, alteration to the vehicle configuration can affect the control program corresponding to the altered vehicle. If the vehicle body height is altered, such as by lowering the vehicle body closer to the road, the vehicle can be more aerodynamic. Thus, the altered vehicle can experience less drag while traveling on the road. The lowering of the vehicle body height can be by way of lowering the suspension level of the vehicle. When comparing a first vehicle (i.e., the altered vehicle) with a second vehicle having the same make and model as the first vehicle, a first brake level of the first vehicle can be higher than a second break level of the second vehicle. This is due to the first vehicle experiencing less drag, therefore, requiring a higher brake level to stop the first vehicle at the same distance as the second vehicle (e.g., with operator applying the same force to the brake pedal).

In some implementations, the road profile may indicate a flat road around the location of the vehicle. The controller of the DPS associated with each of the one or more vehicles can determine not to adjust any component of their vehicle. In response to the determination not to adjust at least one component, the process may be reiterated or repeated, such as by looping back to step 505. Accordingly, the DPS of the vehicle may receive additional sensor data to determine a second road profile at a second location corresponding to the vehicle.

At step 555, the DPS can adjust the at least one component of the one or more vehicles in response to determining to adjust the at least one component. The adjustment can be based on the road profile information, such as the road height, the road grade, and the road friction. For example, the controller of the DPS can adjust the at least one component of the one or more vehicles based on the road height of the road profile. The adjustment of the component based on the road height can be similar to at least step 440 of method 400.

The controller can adjust the component of the vehicle based on the road grade of the road profile. For example, the road grade can indicate curvature throughout a distance of the road. The curvature can be derived from multiple road heights at multiple locations throughout the distance of the road. The controller can associate the curvature of the road with at least one instruction stored in the control program of the vehicle. The control program can include a hash table, such that the controller can perform a hash function to determine instructions corresponding with a characteristic of the road. For example, the vehicle can approach an exit path of a highway. The road grade can indicate a 15 degrees downward slope from the left side (i.e., curb) of the road to the right side of the road. The 15 degrees downward slope can propagate throughout the 200 meters distance of the exit path having a curvature of 150 meters. Based on the slope, the distance of the road, and the curvature measurement, the controller can select an instruction associated with the information. The instruction can include adjusting the steering system and the suspension system of the vehicle. In further example, the controller can assist with steering one or more vehicles throughout the distance of the road via a feedback loop to the steering wheel. The feedback based on the vehicle configuration data and sensor data indicating at least the speed of the vehicle, such that the operator may not be required to apply force to the steering wheel to maintain the vehicle in a lane.

The controller can adjust the component of the vehicle based on the road friction of the road profile. The road friction can be determined based on at least the road height (e.g., inclination), vehicle tire pressure, road temperature, and other environmental conditions. The road profile can be mapped based on the aforementioned data, such as to determine the road friction for the one or more vehicles. For example, if the traffic direction is uphill, the vehicle can experience higher friction, than if the traffic direction is downhill. With higher tire pressure, less area of one or more tires can contact the road, leading to less friction between the tires and the road. On the other hand, if the tire has less pressure, more surface area of the tire can be exposed to the road leading to a higher friction level. The road temperature can affect the texture of the tire, such that higher road temperature can soften the tire leading to an increase in tire area exposure (i.e., increase in friction level). Thus, the DPS can map the road profile based on the road surface data and the vehicle data, and the controller can adjust at least one component of the vehicle accordingly.

In some implementations, the controller can adjust the component of the vehicle based on low-frequency road noise. The low-frequency road noise can refer to traffic density on the road. For example, higher traffic density can lead to occasional low vehicle velocity and more occasional braking. The traffic density may be mapped into the road profile for adjusting the component of the vehicle. In such cases, the controller can decrease the braking level to reduce jittering and improve fuel efficiency. In some implementations, the controller can adjust the component of the vehicle based on an obstruction on the road. For example, obstructions can be mapped in the road profile including locations of the obstructions. One or more vehicles may approach a location having an obstruction. Based on the type of obstruction, the controller can adjust the vehicle system responsively. For example, if the vehicle approaches a pothole, the controller can adjust the suspension system. If the vehicle approaches a sharp turn, such as 90 degrees turn, the controller can adjust the steering system to assist with the turn. Additionally, if the vehicle approaches a pedestrian or other object that may be unavoidable, the controller can increase the braking coefficient to improve the braking force applied to the vehicle. As such, the controller can adjust the component of the vehicle based on an effect or impact the obstacle introduce to the vehicle. Subsequent to adjusting the vehicle system of at least one of the one or more vehicles, the DPS and the server can reiterate the process, such as transitioning back to step 505 of method 500.

Figure 6:
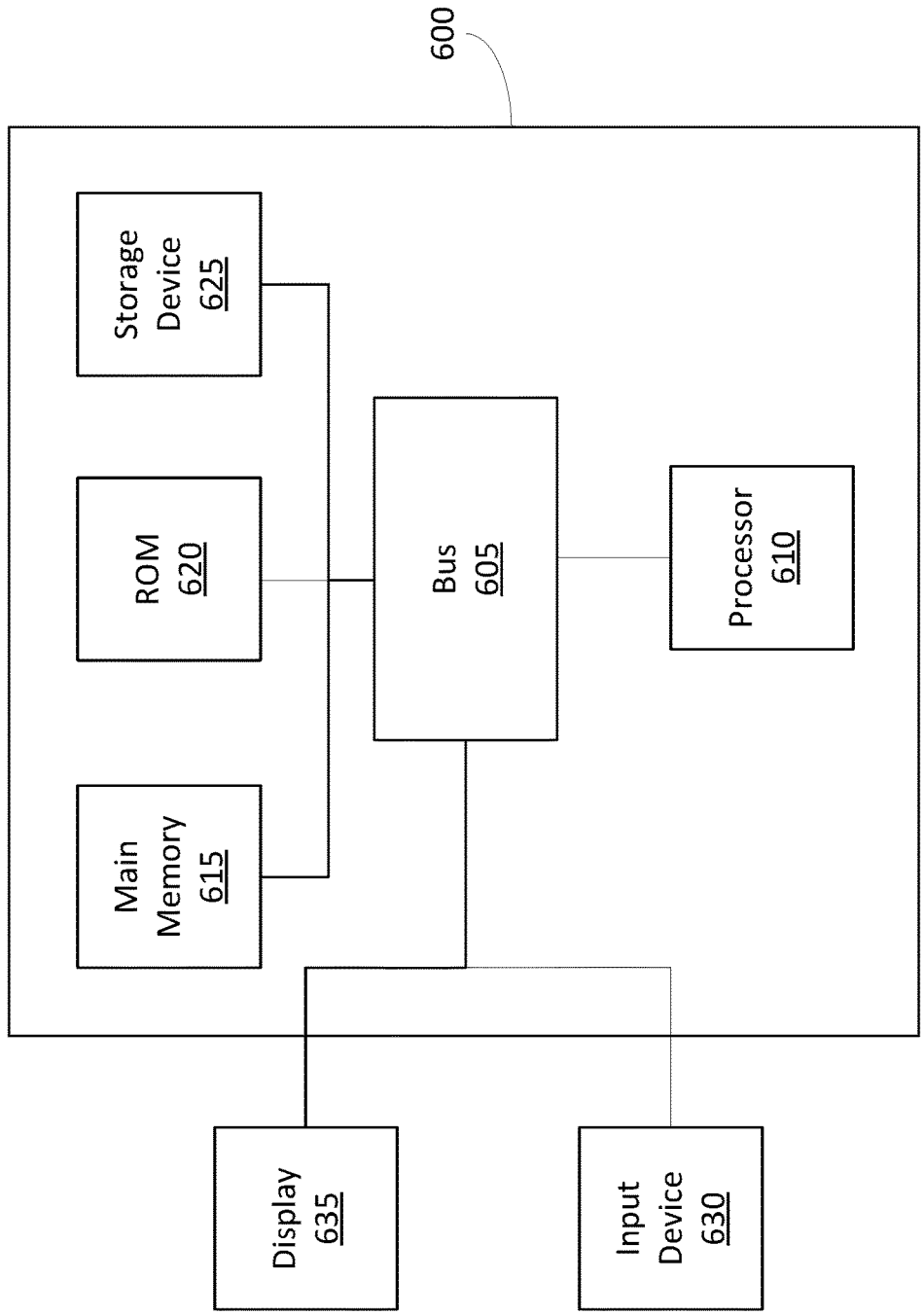
FIG. 6 is a block diagram illustrating an architecture for a computer system that can be employed to implement elements of the systems, methods, and apparatus described and illustrated herein, including, for example, the systems and apparatus depicted in FIGS. 1-2, and the methods depicted in FIGS. 3-4.

FIG. 6 is a block diagram of an example computer system 600. The computer system or computing device 600 can include or be used to implement one or more component of system 100, or perform one or more aspect of the method 400 or 500. For example, the system 600 can implement one or more component or functionality of the system 100, the DPS 102, the vehicle, or the server 188. The computing system 600 includes at least one bus 605 or other communication component for communicating information and at least one processor 610 or processing circuit coupled to the bus 605 for processing information. The computing system 600 can also include one or more processors 610 or processing circuits coupled to the bus for processing information. The computing system 600 also includes at least one main memory 615, such as a random access memory (RAM) or other dynamic storage device, coupled to the bus 605 for storing information, and instructions to be executed by the processor 610. The main memory 615. The main memory 615 can also be used for storing one or more of a propeller control program, tank map, collected data, tank inspection process, quality metric, diagnostic program, or other information. The computing system 600 may include at least one read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions. The storage device 625 can include or be part of the data repository 160.

The computing system 600 may be coupled via the bus 605 to a display 635, such as a liquid crystal display, or active matrix display, for displaying information to an operator of the vehicle 101. An input device 630, such as a keyboard or voice interface may be coupled to the bus 605 for communicating information and commands to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 (e.g., on a vehicle dashboard) can, for example, be part of the DPS 102, vehicle 101, or other component depicted herein.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components, such as components of the DPS 102, which illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A system to control components of a vehicle, comprising:
   a data processing system comprising one or more processors and memory to:
   receive, via an inertial measurement unit ("IMU") on the vehicle that measures at a frequency of at least 100 Hertz, vertical acceleration data, angular velocity data, and lateral acceleration data;
   receive, via a first range sensor on the vehicle that measures at the frequency and is located on a lateral axis of the vehicle with the IMU, first vertical displacement data corresponding to a distance between the first range sensor and a first portion of a ground that contacts a first tire of the vehicle;
   receive, via a second range sensor on the vehicle that measures at the frequency and is located on the lateral axis of the vehicle with the IMU, second vertical displacement data corresponding to a distance between the second range sensor and a second portion of the ground that contacts a second tire of the vehicle;
   receive, via a positioning sensor on the vehicle, location data of the vehicle and altitude data of the vehicle;
   determine a vertical vehicle body height based on fusing the vertical acceleration data and the altitude data;
   determine a vehicle roll angle based on fusing the vertical acceleration data, the angular velocity data, and the lateral acceleration data;
   determine a first height of a first side of the vehicle and a second height of a second side of the vehicle based on a track width of the vehicle, the first vertical displacement data, the second vertical displacement data, the vertical vehicle body height, and the vehicle roll angle;
   determine a road height at the location on the ground based on the first height of the first side of the vehicle and the second height of the second side of the vehicle; and
   provide the road height to a controller of one or more vehicles to cause the controller to control a component of the one or more vehicles based on the road height.

2. The system of claim 1, wherein the data processing system is further configured to:
   receive, via at least one imaging sensor on the vehicle, a road image at the location of the vehicle;
   determine, based on the road image, road grade data and road friction data of the ground; and
   provide the road grade data and the road friction data to the controller of the one or more vehicles to control the component of the one or more vehicles; and
   adjust, via the controller of the one or more vehicles, a braking coefficient and throttle of the vehicle based on the road grade data and the road friction data.

3. The system of claim 1, wherein the data processing system is further configured to:
   receive, via at least one imaging sensor on the vehicle, a road image and lateral deviation data at the location of the vehicle;
   detect, using an image processing technique, a lane of the ground at the location of the vehicle and an object on the ground based on the road image, the object comprising a type of obstruction on the ground;
   determine, based on the lateral deviation data, a lateral distance indicating the location of the vehicle from a center of the lane; and
   generate, based on the lane of the ground and the lateral distance, a road profile of the ground indicating the object on the ground at the location of the vehicle, the road profile indicating a vertical model of the ground.

4. The system of claim 1, wherein the IMU is located at a distal end, proximal end, or between the distal end and the proximal end of a longitudinal axis of the vehicle, the first range sensor and the second range sensor located on the lateral axis of the vehicle with the IMU.

5. The system of claim 1, wherein the track width indicates a distance between a first center width of the first tire and a second center width of the second tire, the first tire and the second tire on the lateral axis of the vehicle, and wherein the first side of the vehicle corresponds to the first center width of the first tire and the second side of the vehicle corresponds to the second center width of the second tire.

6. The system of claim 1, wherein the data processing system is further configured to:
store the road height determined based on the first height of the vehicle and the second height of the vehicle in the memory; and
upload, via an interface of the vehicle in communication with a server, the road height at the location of the ground to the server.

7. The system of claim 1, wherein the data processing system is further configured to:
upload, via an interface of the vehicle, the road height to a server;
receive, from the server, an instruction to control the component of the one or more vehicles in response to the server processing the road height at the location on the ground; and
provide the instruction to the controller of the one or more vehicles to cause the controller to control the component of the one or more vehicles based on the instruction.

8. The system of claim 1, wherein the data processing system is further configured to:
generate a road profile at the location based on the road height determined at the location on the ground, the road profile stored in the memory;
provide, via a display device of the vehicle, a notification comprising an interactive element to display the road profile;
receive, via the display device, an indication of an interaction with the interactive element to update the road profile; and
display, responsive to the indication of the interaction, the road profile of the ground on the display device of the vehicle.

9. The system of claim 1, wherein the data processing system is further configured to:
control suspension of one or more wheels of the one or more vehicles based on the road height determined at the location.

10. The system of claim 1, wherein the data processing system is further configured to:
actively steer the vehicle based on the road height determined at the location.

11. The system of claim 1, wherein the data processing system is further configured to:
generate a first state-space model including a first stochastic noise based on the vertical acceleration data and the altitude data;
generate a second state-space model including a second stochastic noise based on the vertical acceleration data, the angular velocity data, and the lateral acceleration data;
determine, using a Kalman filter on the first state-space model, the vertical vehicle body height; and
determine, using the Kalman filter on the second state-space model, the vehicle roll angle.

12. The system of claim 1, wherein the data processing system is further configured to:
determine a second vertical acceleration data and a second lateral acceleration data based on filtering the vertical acceleration data and the lateral acceleration data with a low-pass filter having a cutoff frequency of at least 0.5 Hertz; and determine the vehicle roll angle based on fusing the second vertical acceleration data, the angular velocity data, and the second lateral acceleration data.

13. The system of claim 1, wherein the IMU comprises at least one accelerometer and at least one gyroscope, and the data processing system is further configured to:
receive, via the at least one accelerometer, the vertical acceleration data and the lateral acceleration data; and
receive, via the at least one gyroscope, the angular velocity data.

14. A method for controlling components of a vehicle, comprising:
receiving, by a data processing system comprising one or more processors and memory, via an inertial measurement unit ("IMU") on the vehicle that measures at a frequency of at least 100 Hertz, vertical acceleration data, angular velocity data, and lateral acceleration data;
receiving, by the data processing system, via a first range sensor on the vehicle that measures at the frequency and is located on a lateral axis of the vehicle with the IMU, first vertical displacement data corresponding to a distance between the first range sensor and a first portion of a ground that contacts a first tire of the vehicle;
receiving, by the data processing system, via a second range sensor on the vehicle that measures at the frequency and is located on the lateral axis of the vehicle with the IMU, second vertical displacement data corresponding to a distance between the second range sensor and a second portion of the ground that contacts a second tire of the vehicle;
receiving, by the data processing system, via a positioning sensor on the vehicle, location data of the vehicle and altitude data of the vehicle;
determining, by the data processing system, a vertical vehicle body height based on fusing the vertical acceleration data and the altitude data;
determining, by the data processing system, a vehicle roll angle based on fusing the vertical acceleration data, the angular velocity data, and the lateral acceleration data;
determining, by the data processing system, a first height of a first side of the vehicle and a second height of a second side of the vehicle based on a track width of the vehicle, the first vertical displacement data, the second vertical displacement data, the vertical vehicle body height, and the vehicle roll angle;
determining, by the data processing system, a road height at the location on the ground based on the first height of the first side of the vehicle and the second height of the second side of the vehicle; and
providing, by the data processing system, the road height to a controller of one or more vehicles to cause the controller to control a component of the one or more vehicles based on the road height.

15. The method of claim 14, further comprising:
receiving, by the data processing system, via at least one imaging sensor on the vehicle, a road image at the location of the vehicle;
determining, by the data processing system, based on the road image, road grade data and road friction data of the ground; and
providing, by the data processing system, the road grade data and the road friction data to the controller of the one or more vehicles to control the component of the one or more vehicles; and adjusting, by the data processing system, via the controller of the vehicle, a braking coefficient and throttle of the one or more vehicles based on the road grade data and the road friction data.

16. The method of claim 14, further comprising:

receiving, by the data processing system, via at least one imaging sensor on the vehicle, a road image and lateral deviation data at the location of the vehicle;

detecting, by the data processing system, using an image processing technique, a lane of the ground at the location of the vehicle and an object on the ground based on the road image, the object comprising a type of obstruction on the ground;

determining, by the data processing system, based on the lateral deviation data, a lateral distance indicating the location of the vehicle from a center of the lane; and generating, by the data processing system, based on the lane of the ground and the lateral distance, a road profile of the ground indicating the object on the ground at the location of the vehicle, the road profile indicating a vertical model of the ground.

17. The method of claim 14, further comprising:

storing, by the data processing system, the road height determined based on the first height of the vehicle and the second height of the vehicle in the memory;

uploading, by the data processing system, via an interface of the vehicle in communication with a server, the road height at the location of the ground to the server;

receiving, by the data processing system, from the server, an instruction to control the component of the one or more vehicles in response to the server processing the road height at the location on the ground; and providing, by the data processing system, the instruction to the controller of the one or more vehicles to cause the controller to execute the instruction comprising:

controlling, by the controller in communication with the data processing system, suspension of one or more wheels of the one or more vehicles based on the road height determined at the location; and actively steering the one or more vehicles based on the road height determined at the location.

18. The method of claim 14, further comprising:

generating, by the data processing system, a road profile at the location based on the road height determined at the location on the ground, the road profile stored in the memory;

providing, by the data processing system, via a display device of the vehicle, a notification comprising an interactive element to display the road profile;

receiving, by the data processing system, via the display device, an indication of an interaction with the interactive element to update the road profile; and displaying, by the data processing system, responsive to the indication of the interaction, the road profile of the ground on the display device of the vehicle.

19. The method of claim 14, further comprising:

generating, by the data processing system, a first state-space model including a first stochastic noise based on the vertical acceleration data and the altitude data;

generating, by the data processing system, a second state-space model including a second stochastic noise based on the vertical acceleration data, the angular velocity data, and the lateral acceleration data;

determining, by the data processing system, using a Kalman filter on the first state-space model, the vertical vehicle body height; and determining, by the data processing system, using the Kalman filter on the second state-space model, the vehicle roll angle.

20. The method of claim 14, further comprising:

determining, by the data processing system, a second vertical acceleration data and a second lateral acceleration data based on filtering the vertical acceleration data and the lateral acceleration data with a low-pass filter having a cutoff frequency of at least 0.5 Hertz; and determining, by the data processing system, the vehicle roll angle based on fusing the second vertical acceleration data, the angular velocity data, and the second lateral acceleration data.

\* \* \* \* \*